(12) United States Patent
Pao et al.

(10) Patent No.: US 11,419,052 B2
(45) Date of Patent: Aug. 16, 2022

(54) TECHNIQUES FOR HANDLING MEASUREMENT SET ADAPTATION

(71) Applicant: Acer Incorporated, New Taipei (TW)

(72) Inventors: Wei-Chen Pao, Hsinchu County (TW); Chien-Min Lee, Taoyuan (TW)

(73) Assignee: ACER INCORPORATED, New Taipei (TW)

( * ) Notice: Subject to any disclaimer, the term of this patent is extended or adjusted under 35 U.S.C. 154(b) by 203 days.

(21) Appl. No.: 16/831,227

(22) Filed: Mar. 26, 2020

(65) Prior Publication Data

US 2020/0322887 A1 Oct. 8, 2020

Related U.S. Application Data

(60) Provisional application No. 62/828,490, filed on Apr. 3, 2019.

(51) Int. Cl.
*H04W 52/02* (2009.01)
*H04B 7/024* (2017.01)
(Continued)

(52) U.S. Cl.
CPC ........ *H04W 52/0229* (2013.01); *H04B 7/024* (2013.01); *H04B 7/0626* (2013.01); *H04L 1/0026* (2013.01); *H04L 5/0048* (2013.01); *H04L 5/0057* (2013.01); *H04W 24/10* (2013.01); *H04W 72/085* (2013.01); *H04W 72/1284* (2013.01)

(58) Field of Classification Search
CPC ............. H04W 52/02; H04W 52/0229; H04W 52/0235; H04B 7/024; H04B 7/0413; H04B 7/0452; H04B 7/0602; H04B 7/0617; H04B 7/0626; H04L 1/0026; H04L 5/0048; H04L 5/0057
See application file for complete search history.

(56) References Cited

U.S. PATENT DOCUMENTS

2017/0331577 A1* 11/2017 Parkvall ................ H04L 5/0053
2018/0102826 A1* 4/2018 Raghavan .............. H04B 7/063
(Continued)

FOREIGN PATENT DOCUMENTS

WO 2017173037 A1 10/2017
WO 2018106175 A1 6/2018

OTHER PUBLICATIONS

European Patent Office; Extended European Search Report from corresponding EP Application No. 20167562.6 dated Aug. 13, 2020; pp. 1-13; Published: EP.

(Continued)

*Primary Examiner* — Kent Krueger
(74) *Attorney, Agent, or Firm* — Polsinelli PC

(57) ABSTRACT

A user equipment (UE) interacts with a base station (BS) to activate a power saving mode based on a triggering condition. The UE receives reference signals (RSs) from a first RS-set of quasi-colocated (QCLd) RSs, derives a measurement result by measuring the RSs, and uses the first measurement result (and in some cases measurements results for other RS set) for evaluation of the triggering condition to identify whether the triggering condition is satisfied. The UE and the BS switch from the first RS-set to a second RS-set once the triggering condition is satisfied.

37 Claims, 20 Drawing Sheets

(51) Int. Cl.
   H04B 7/06     (2006.01)
   H04L 5/00     (2006.01)
   H04L 1/00     (2006.01)
   H04W 24/10    (2009.01)
   H04W 72/08    (2009.01)
   H04W 72/12    (2009.01)

(56) References Cited

U.S. PATENT DOCUMENTS

| | | | |
|---|---|---|---|
| 2018/0249453 A1* | 8/2018 | Nagaraja | H04W 72/042 |
| 2018/0262313 A1* | 9/2018 | Nam | H04L 5/0044 |
| 2018/0279145 A1* | 9/2018 | Jung | H04W 24/08 |
| 2018/0288645 A1* | 10/2018 | Lee | H04B 7/0478 |
| 2020/0045569 A1* | 2/2020 | Seo | H04B 7/0695 |
| 2020/0068462 A1* | 2/2020 | Zetterberg | H04W 36/0058 |
| 2020/0084678 A1* | 3/2020 | Gunnarsson | H04W 24/10 |
| 2021/0368481 A1* | 11/2021 | Jo | H04W 72/042 |

OTHER PUBLICATIONS

NTT Docomo et al.; "Discussion on NR RRM measurement based on CSI-RS for L3 mobility"; 3GPP Draft; May 14, 2017.
Samsung; "On Beam Management, Measurement and Reporting"; 3GPP TSG RAN WG1 Meeting 90bis; Prague, CZ; Oct. 9-13, 2017.
Motorola; "Measurement Period and Implication of DRX"; 3GPP TSG RAN WG1 Meeting #49; Kobe, Japan; May 7-11, 2007.

\* cited by examiner

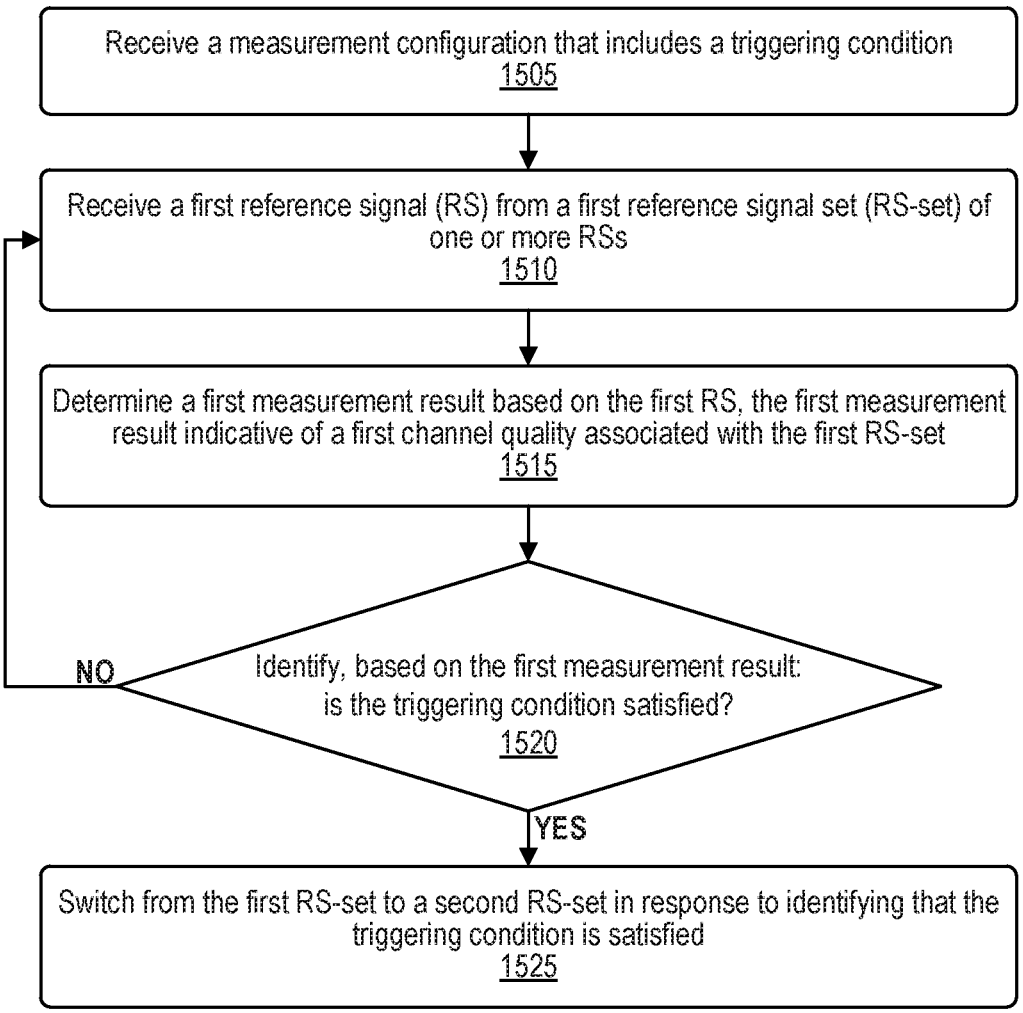

```
                    ┌─ 1500

┌─────────────────────────────────────────────────────────────┐
│  Receive a measurement configuration that includes a        │
│                   triggering condition                       │
│                          1505                                │
└─────────────────────────────────────────────────────────────┘
                              │
                              ▼
┌─────────────────────────────────────────────────────────────┐
│  Receive a first reference signal (RS) from a first          │
│       reference signal set (RS-set) of one or more RSs       │
│                          1510                                │
└─────────────────────────────────────────────────────────────┘
                              │
                              ▼
┌─────────────────────────────────────────────────────────────┐
│  Determine a first measurement result based on the first RS, │
│  the first measurement result indicative of a first channel  │
│           quality associated with the first RS-set           │
│                          1515                                │
└─────────────────────────────────────────────────────────────┘
                              │
                              ▼
                       Identify, based on the first measurement result:
        NO ◄──────  is the triggering condition satisfied?
                                    1520
                              │
                             YES
                              ▼
┌─────────────────────────────────────────────────────────────┐
│  Switch from the first RS-set to a second RS-set in response │
│       to identifying that the triggering condition is        │
│                           satisfied                          │
│                            1525                              │
└─────────────────────────────────────────────────────────────┘
```

*FIG. 15A*

TECHNIQUES FOR HANDLING MEASUREMENT SET ADAPTATION

CROSS-REFERENCE TO RELATED APPLICATION

The present application claims the priority benefit of U.S. provisional application No. 62/828,490 filed Apr. 3, 2019, titled "Methods for Handling Measurement Set Adaptation," the disclosure of which is incorporated herein by reference.

FIELD

The present disclosure generally relates to a method used in a wireless communication systems and related communication devices, and more particularly, to methods of handling measurement set adaptation.

BACKGROUND

A long-term evolution (LTE) system supporting the 3rd Generation Partnership Project (3GPP) Rel-8 standard and/or the 3GPP Rel-9 standard were developed by the 3GPP as a successor to the universal mobile telecommunication system (UMTS). The LTE system was developed for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

A fifth generation (5G) system (5GS) (e.g., 5G new radio access network (5G-NR)) is an evolution of a continuous mobile broadband process to meet the requirements of 5G as introduced by International Mobile Telecommunications (IMT)-2020. The 5GS may include a radio access network (RAN) and a core network (CN). The RAN may include at least one base station (BS). The at least one BS may include an evolved Node-B (eNB) or a 5G Node-B (gNB), for communicating with at least one UE and for communicating with the CN. The CN may include a MME, a signaling gateway (SGW), an access and mobility management function (AMF), a user plane function (UPF), and/or other architecture components for a NAS control.

UEs are often battery-powered. Battery-powered UEs generally only function properly only as long as their batteries retain charge. Conditions that require a UE to switch from one antenna to another may in some cases drain battery power at the UE. Conditions that require the UE to amplify signals, or send signals multiple times, may in some cases drain battery power at the UE. Such power-draining conditions should be avoided in order to conserve (or "save") the UE's power.

SUMMARY

Techniques and systems are described herein for handling measurement set adaptation to configure power saving. A user equipment (UE) interacts with a base station (BS) to activate a power saving mode that is configured based on one or more triggering conditions. The UE receives one or more reference signals (RSs) from a first RS-set of one or more quasi-colocated (QCLd) RSs, determines a measurement result by measuring the one or more RSs, and uses the first measurement result (and in some cases measurements results for other RS set) for evaluation of the triggering condition to identify whether the one or more triggering conditions are satisfied The UE and the BS switch from the first RS-set to a second RS-set once the one or more triggering conditions are satisfied.

In one example, a method for handling measurement set adaptation by a user equipment (UE) is provided. The method includes receiving a first reference signal (RS) from a first reference signal set (RS-set) of one or more RSs. The method also includes deriving a first measurement result by measuring the first RS. The first measurement result is indicative of a first channel quality associated with the first RS-set. The method also includes using the first measurement result for evaluation of a triggering condition.

In another example, an apparatus handling measurement set adaptation includes one or more receivers that receive a first reference signal (RS) from a first reference signal set (RS-set) of one or more RSs. The apparatus also includes a memory storing instructions and a processor executing the instructions. Execution of the instructions by the processor causes the processor to perform system operations. The system operations include deriving a first measurement result by measuring the first RS. The first measurement result is indicative of a first channel quality associated with the first RS-set. The system operations also include using the first measurement result for evaluation of a triggering condition.

In another example, a non-transitory computer-readable medium is provided having stored thereon instructions that, when executed by one or more processors, cause the one or more processors to perform a method of handling measurement set adaptation. The method includes receiving a first reference signal (RS) from a first reference signal set (RS-set) of one or more RSs. The method also includes deriving a first measurement result by measuring the first RS. The first measurement result is indicative of a first channel quality associated with the first RS-set. The method also includes using the first measurement result for evaluation of a triggering condition This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 15A is a flow diagram illustrating a first set of operations for handling measurement set adaptation;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

UE power consumption can be reduced in several ways. In the frequency domain, UE power consumption can be reduced by aggregating carriers through carrier aggregation (CA) or dual connectivity (DC). UE power consumption can be reduced through Bandwidth Part (BWP) adaptation, which can reduce the volume of data that the UE has to process when maximum throughput is not needed. In the time domain, UE power consumption can be reduced by adopting cross-slot, single slot, or multi-slot scheduling. In the antenna domain, UE power consumption can be reduced by reducing the number of transmission (TX) and/or receiving (RX) antennas, panels, or multiple-input multiple-output (MIMO) layers. UE power consumption can be reduced by performing and/or reporting measurements less frequently, for example for radio resource management (RRM) and/or channel state information (CSI) measurements.

Figure 1A:
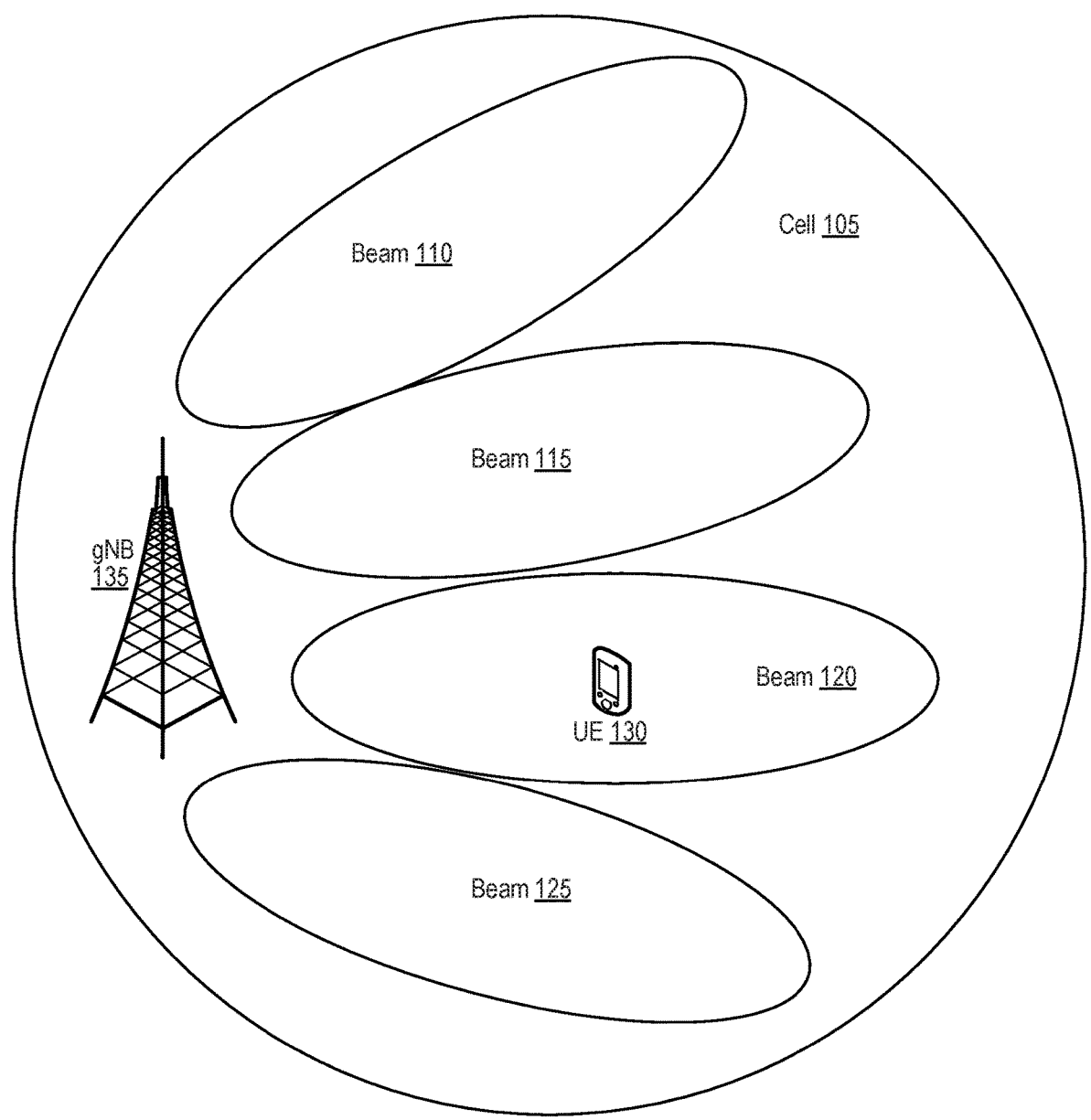
FIG. 1A illustrates a 5G Node B (gNB) serving a cell with multiple beams, with a User Equipment (UE) located in the coverage area of one of the beams.

FIG. 1A illustrates a 5G Node B (gNB) serving a cell with multiple beams, with a User Equipment (UE) located in the coverage area of one of the beams.

A BS (e.g., a eNB or gNB) in a network (e.g., the above E-UTRAN or 5G-NR) may manage radio resources and mobility in a cell or sector. A cell or sector may be covered by multiple beams. For example, the gNB 135 of FIG. 1A manages radio resources and mobility in a cell 105, which includes four illustrated beams: beam 110, beam 115, beam 120, and beam 125. A UE 130 is located in the coverage area of the beam 120. The gNB 135 can send data, such as one or more reference signals (RSs), to the UE 130 via one or more of the beams 110, 115, 120, or 125. The UE 130 can receive the data (e.g., the one or more RSs) via the one or more of the beams 110, 115, 120, or 125. In some cases, the UE 130 may need to use different receivers, receiver antennae, or receiver antenna panels to receive signals via different ones of the beams 110, 115, 120, or 125.

Figure 1B:
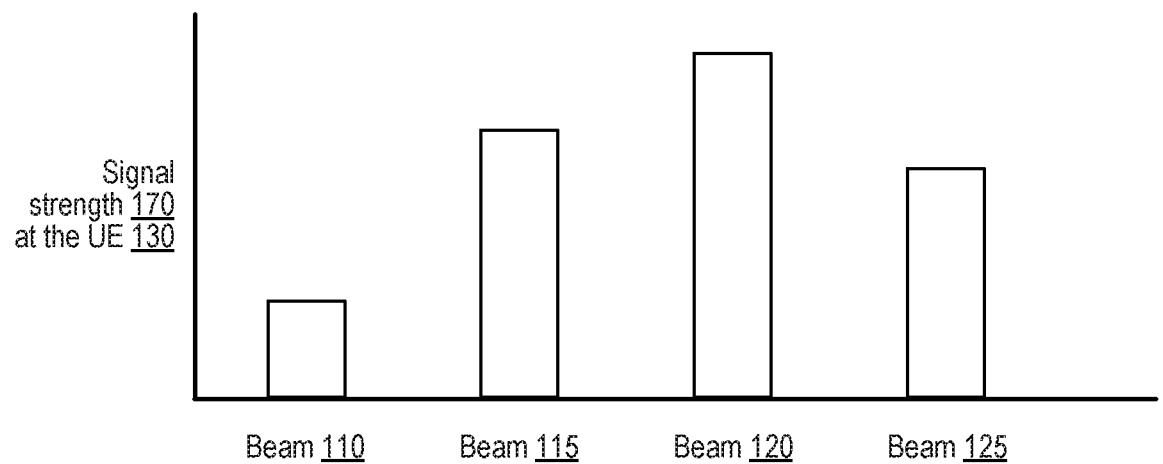
FIG. 1B illustrates signal strength measurements by the User Equipment (UE) associated with the beams of FIG. 1A.

FIG. 1B illustrates signal strength measurements by the User Equipment (UE) associated with the beams of FIG. 1A.

The UE 130 of FIG. 1A may receive one or more signals from the gNB 135 of FIG. 1A at different signal strengths 170 depending on the beam over which those signals were sent. The bar chart 150 of FIG. 1B illustrates four signal strength values, each corresponding to one of the four beams illustrated in FIG. 1A (i.e., beam 110, beam 115, beam 120, and beam 125). The vertical axis corresponds to signal strength 170 at the UE 130. While no numerical values are shown along the vertical signal strength 170 axis, the bar chart 150 indicates that the signal strength 170 as received at the UE 130 of signals corresponding to the beam 120 is the highest. The signal strength 170 as received at the UE 130 of signals corresponding to the beam 120 is the highest because the UE 130 is located in the coverage of the beam 120. The signal strength 170 as received at the UE 130 of signals corresponding to the beam 115 is lower than the signal strength of signals corresponding to the beam 120. The signal strength 170 as received at the UE 130 of signals corresponding to the beam 125 is lower than the signal strength of signals corresponding to the beam 115. The signal strength 170 as received at the UE 130 of signals corresponding to the beam 110 is lower than the signal strength of signals corresponding to the beam 125, and thus has the weakest signal strength of the four beams 110, 115, 120, and 125. The signal strength 170 as received at the UE 130 of signals corresponding to beams 115 and 125 are the second and third highest, respectively, because beams 115 and 125 are adjacent to beam 120, and the UE 130 is located in the coverage of the beam 120. The signal strength 170 as received at the UE 130 of signals corresponding to beam 110 are the lowest because beams 110 is the farthest of the beams from beam 120, and the UE 130 is located in the coverage of the beam 120.

Figure 2:
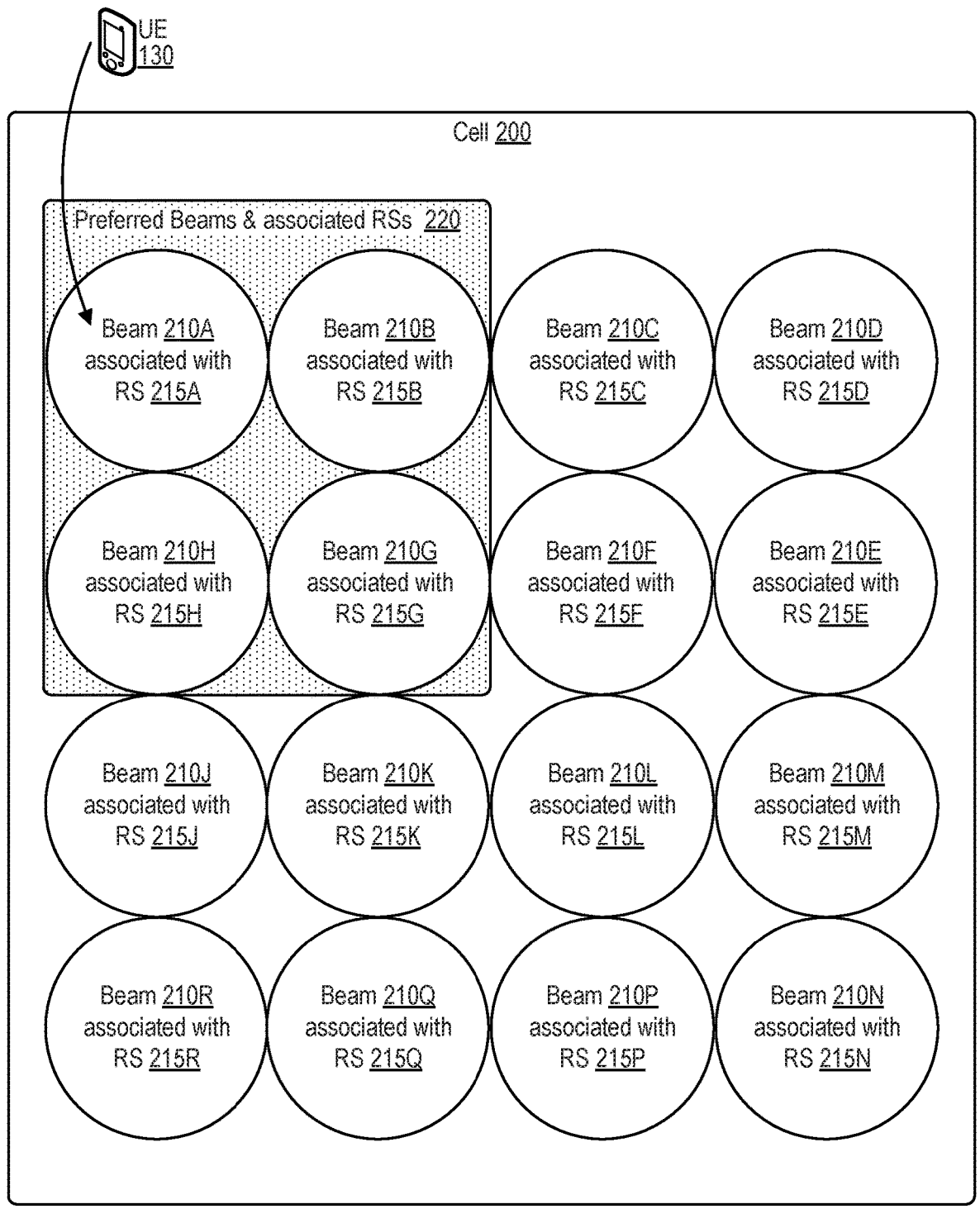
FIG. 2 illustrates a cell with multiple beams that are each associated with a corresponding reference signal (RS), with a User Equipment (UE) located in the coverage area of one of the beams.

FIG. 2 illustrates a cell with multiple beams that are each associated with a corresponding reference signal (RS), with a User Equipment (UE) located in the coverage of one of the beams.

More specifically, a cell 200 with sixteen beams 210A-210N is illustrated in FIG. 2. Each beam in a cell may be associated with at least one reference signal (RS) sent from the gNB 135 to the UE 130, such as a synchronization signal block (SSB) and/or a channel state information reference signal (CSI-RS). In the context of FIG. 2, each beam 210 in the cell 200 is associated with a RS. As shown, each of the beams 210A-N of the cell 200 is associated with a corresponding one of the RSs 215A-N, with beam 210A corresponding to RS 215A, beam 210B corresponding to RS 215B, beam 210C corresponding to RS 215C, beam 210D corresponding to RS 215D, and so forth.

In the context of the cell 200 of FIG. 2, the UE 130 is located in the coverage of the beam 210A. Thus, the beam 210A and the associated RS 215A are preferred for use by the UE and the gNB due to high signal strength, which would provide better channel quality than other beams.

In some cases, an issue may arise that forces high power expenditure by the UE when a UE is unable to perform measurement reporting using the beam whose coverage the UE is located within. For example, if the UE is located within a coverage of beam 210A as in FIG. 2, the UE may be configured to perform a measurement, such as a CSI measurement, for RS 215A, which may be a CSI-RS. However, in some cases, the UE may need to perform measurements for another RS (e.g., any of RS 215B-N) in order to support UE mobility, beam management, and/or data scheduling. Since the gNB might not know enough information about the UE 130, the UE 130 may be forced to use a RS for a beam 210 that the UE is located far away from. This could force high power expenditure by the UE 130 to compensate for the low signal strength and/or low channel quality corresponding to the beam that is selected to be a beam other than beam 210A.

Beams 210B, 210G, and 210H are located adjacent to beam 210A. If the beam 210A and corresponding RS 215A cannot be used, adjacent beams 210B, 210G, and 210H and corresponding RSs 215B, 215G, and 215H will provide the best signal strength and/or channel quality of the remaining beams 210B-N. Thus, a set of preferred beams and corresponding RSs 220 are highlighted in the cell 200 FIG. 2 and include the beam 210A as well as adjacent beams 210B, 210G, and 210H.

In order to reduce power consumption by the UE 130, one of the beams 210A-210N and/or RSs 215A-215N within the set of preferred beams and corresponding RSs 220 should be used if possible. Specifically, beam 210A and RS 215A is most preferred, followed by adjacent beams 210B, 210G, and 210H and corresponding RSs 215B, 215G, and 215H. Since signal strength and channel quality remain high within the set of preferred beams and corresponding RSs 220 relative to the remaining beams 210C-F and 210J-N and remaining RSs 215C-F and 215J-N, the UE 130 may use less power on signal amplification, error checking, re-receipt or re-transmission of signals, turning on new receiver antenna(e) and/or receiver antenna(e) panels, turning on new transmitter antenna(e) and/or transmitter antenna(e) panels, or some combination thereof.

In some cases, in order to support UE power saving, UE 130 may perform measurements according to spatial domain correlation and/or signal quality. For example, in the context of the cell 200 of FIG. 2, the UE 130 may perform measurement(s) and/or reporting only for RS 215A, 215B, 215G, and/or 215H in order to reduce the power consumption. The UE 130 may avoid performing measurement(s) and/or reporting for any other RS (e.g., RS 215C-F or RS 215J-N).

Figure 3A:
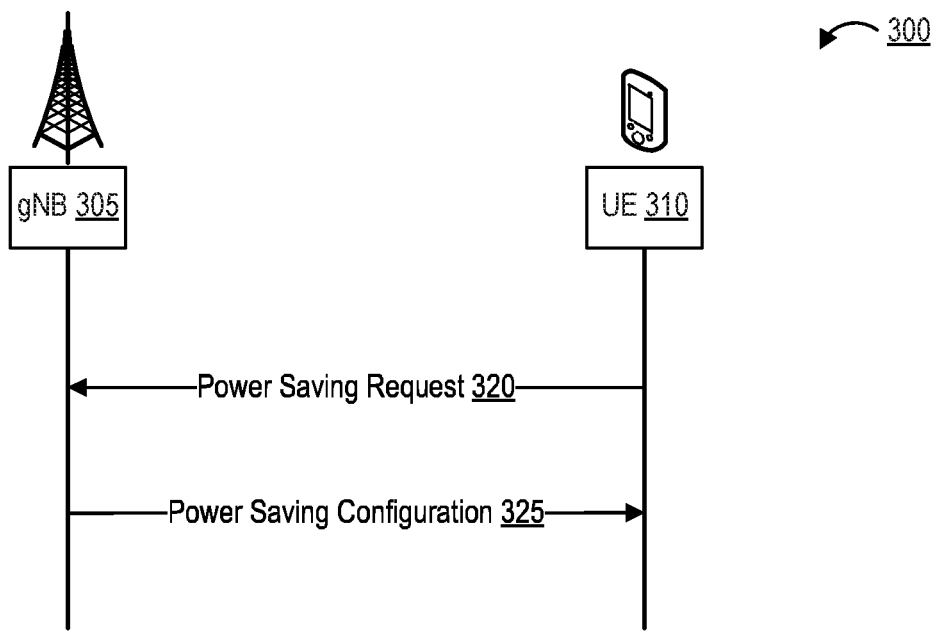
FIG. 3A is a swim lane diagram illustrating a power saving request and configuration process.

FIG. 3A is a swim lane diagram illustrating a power saving request and configuration process.

The power saving request and configuration process 300 of FIG. 3A is a first process in which a power saving mode can be configured and activated. The two lanes of the swim lane diagram of FIG. 3A represent two devices: a gNB 305 and a UE 310, respectively.

In the power saving request and configuration process 300 of FIG. 3A, the UE 310 sends a power saving request 320 to the gNB 305, which the gNB 305 receives. In response to receipt of the power saving request 320 at the gNB 305 from the UE 310, the gNB 305 generates a power saving configuration 325 for the UE 310. In some cases, the gNB 305 can generate the power saving configuration 325 for the UE 310 based on information previously conveyed from the UE 310 to the gNB 305 (e.g., in the power saving request 320 and/or another transmission). In some cases, the power saving request 320 may include some power saving configuration specifics, for example a list of beams and/or corresponding RS s that the UE 310 prefers and that the gNB 305 can choose from in generating the power saving configuration 330. The gNB 305 transmits the generated power saving configuration 325 to the UE 310. The UE 310 receives the power saving configuration 325. In some cases, the UE 310 confirms receipt of the power saving configuration 325 to the gNB 305. Once the UE 310 receives the power saving configuration 325 (and in some cases confirms receipt to the gNB 305), a power saving mode that is based on the power saving configuration 325 is activated at the UE 310 and/or at the gNB 305. The power saving mode is discussed in more detail further below with respect to at least FIGS. 7A-7C.

Figure 3B:
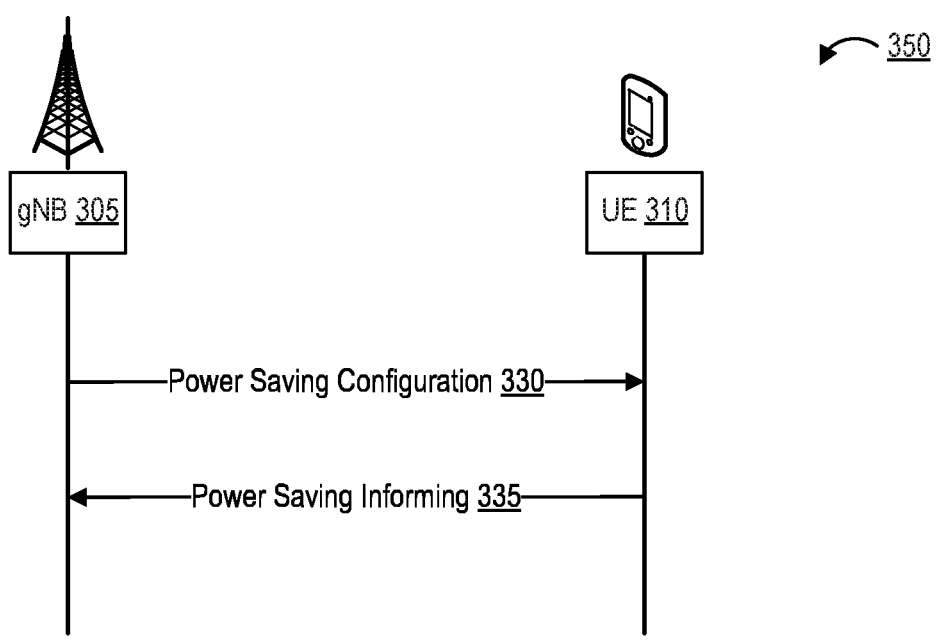
FIG. 3B is a swim lane diagram illustrating a power saving configuration and informing process.

FIG. 3B is a swim lane diagram illustrating a power saving configuration and informing process.

The power saving configuration and informing process 350 of FIG. 3B is a second process in which a power saving mode can be configured and activated. The two lanes of the swim lane diagram of FIG. 3B again represent gNB 305 and the UE 310, respectively.

In the power saving configuration and informing process 350 of FIG. 3B, the gNB 305 generates a power saving configuration 330 for the UE 310. The power saving configuration 330 may be based on information previously conveyed from the UE 310 to the gNB 305. The gNB 305 transmits the generated power saving configuration 330 to the UE 310, which the UE 310 receives. After receiving the power saving configuration 330 at the UE 310 from the gNB 305, once the UE 310 is ready to enter a power saving mode (which may be immediately following receipt of the power saving configuration 330 or later), the UE 310 may inform the gNB 305 that the UE 310 is ready to enter the power saving mode by generating and sending a power saving informing transmission 335 from the UE 310 to the gNB 305. In some cases, the power saving informing transmission 335 may include additional power saving configuration specifics, for example a selection of a particular beam and/or corresponding RS from a list provided by the gNB 305 in the power saving configuration 330. The gNB 305 receives the power saving informing transmission 335 from the UE 310. In some cases, the gNB 305 confirms receipt of the power saving informing transmission 335 to the UE 310. Afterward, a power saving mode that is based on the power saving configuration 330 and/or the power saving informing transmission 335 is activated at the gNB 305 and/or at the UE 310.

A set of one or more beams and/or corresponding RSs may be referred to as an RS-set. For example, the set of preferred beams and associated RSs 220 of FIG. 2 may be referred to as an RS-set. The power saving configurations 325 and 330 may include an RS configuration (e.g., RS configuration 735) that may, for example, identify a list of one or more RS-sets and instruct the UE 310 to select one or more preferred RS-sets from the list. The power saving configurations 325 and 330 may include various types of information. For example, the power saving configurations 325 and 330 may include a RS configuration for measurement and reporting, a priority of RS-sets (also referred to as a prioritization order of RS-sets), and/or a one or more triggering conditions for initiating measurement reporting and/or triggering RS-set change/update. For example, the power saving configurations 325 and 330 may include an identity (ID) of an RS-set and/or associated RS indices. The power saving configurations 325 and 330 may include a number of RSs (e.g., CSI-RS and/or SSB) for each RS-set. The power saving configurations 325 and 330 may include a number of RS-sets. The power saving configurations 325 and 330 may include a list of RS-set IDs corresponding to the number of RS-sets. The power saving configurations 325 and 330 may be referred to as measurement configurations for power saving. During the processes 300 and 350 of FIGS. 3A and 3B, an RS-set may be selected by the UE 310 and/or be configured by the gNB 305 for reducing UE power consumption for (e.g., CSI) measurement operation/reporting and/or for reducing feedback overhead and power consumption for (e.g., CSI) measurement.

Figure 4:
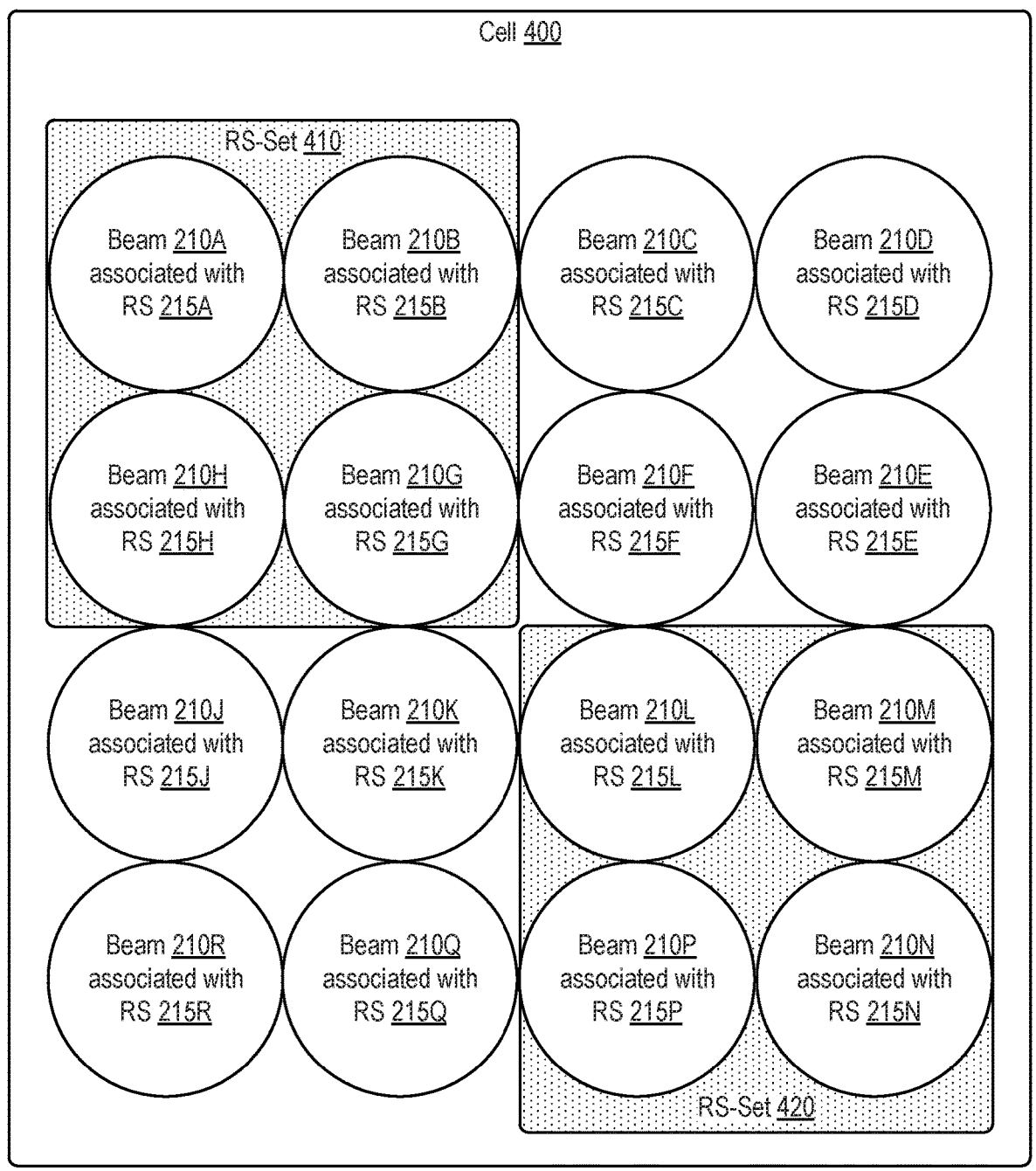
FIG. 4 is a cell with multiple beams that are each associated with a corresponding reference signal (RS), with two non-overlapping sets of beams and corresponding RSs identified as two RS-sets.

FIG. 4 is a cell with multiple beams that are each associated with a corresponding reference signal (RS), with two non-overlapping sets of beams and corresponding RSs identified as two RS-sets.

The cell 400 of FIG. 4 includes the same set of beams 210A-N and corresponding RSs 215A-N of the cell 200 of FIG. 2. The cell 400 includes two RS-sets: a first RS-set 410 and a second RS-set 420. The first RS-set 410 includes beam 210A associated with RS 215A, beam 210B associated with RS 215B, beam 210G associated with RS 215G, and beam 210H associated with RS 215H. Beams 210A, 210B, 210G, and 210H of the first RS-set 410 are each adjacent to one another and arranged in a two-by-two grid. The second RS-set 420 includes beam 210L associated with RS 215L, beam 210M associated with RS 215M, beam 210N associated with RS 215N, and beam 210P associated with RS 215P. Beams 210L, 210M, 210N, and 210P of the second RS-set 420 are each adjacent to one another and arranged in a two-by-two grid.

The first RS-set 410 and the second RS-set 420 do not overlap, in that they do not share any beams 210 and/or associated RSs 215. In some cases, the reference signals in an RS-set may have a spatial domain correlation, meaning that the same receiver may be used to receive reference signals from that RS-set. The UE thus does not need to switch receivers or turn on an additional receiver as long as RSs are received from one of the beams in the same RS-set, conserving power at the UE. For example, the RS-sets and the UE behavior can be restricted (e.g., by a gNB) so that RS-sets have spatial domain correlation, in which case the UE will receive a RS for measurement in the same RS-set using a certain number of beams or receivers (e.g., a single beam). In such an example, the UE does not need to switch or turn on a different receiver to receive another RS in the RS-set. The UE can use one receiver (and corresponding beam) for all of the RSs for the RS-set, saving the battery power of the UE.

In some cases, each RS-set may have a channel quality correlation, in that the UE may receive RSs from that RS-set with similar channel quality and/or similar signal strength, which likewise conserves power at the UE because the UE does not need to change its receiver and/or transmitter configurations, such as its error correction configuration, by much if at all.

In some cases, each RS-set may have the same (e.g., spatial) Quasi Co-Location (QCL) assumption, which may further include the Physical Downlink Control Channel (PDCCH) and/or the Physical Downlink Shared Channel (PDSCH). That is, the same beam or set of beams may be used to receive reference signal data, control channel data, data channel data, and potentially other types of data. Thus, the UE may use the same set of one or more receivers (e.g., one or more antennae, antenna panels, ports, or some combination thereof) to receive the reference signal data, control channel data, data channel data, and potentially other types of data. This provides additional power conservation as the UE does not need to switch to or otherwise power on additional receiver antennae or receiver antennae panels.

In some cases, the above-described restrictions on RS-sets (e.g., spatial domain correlation, channel quality correlation, the same (e.g., spatial) Quasi Co-Location (QCL) assumption, etc.) can be enforced when a UE enters the power saving mode (e.g., the power saving mode that is activated at the gNB 305 and/or at the UE 310 based on the power saving configuration 330 and/or the power saving informing transmission 335).

Figure 5:
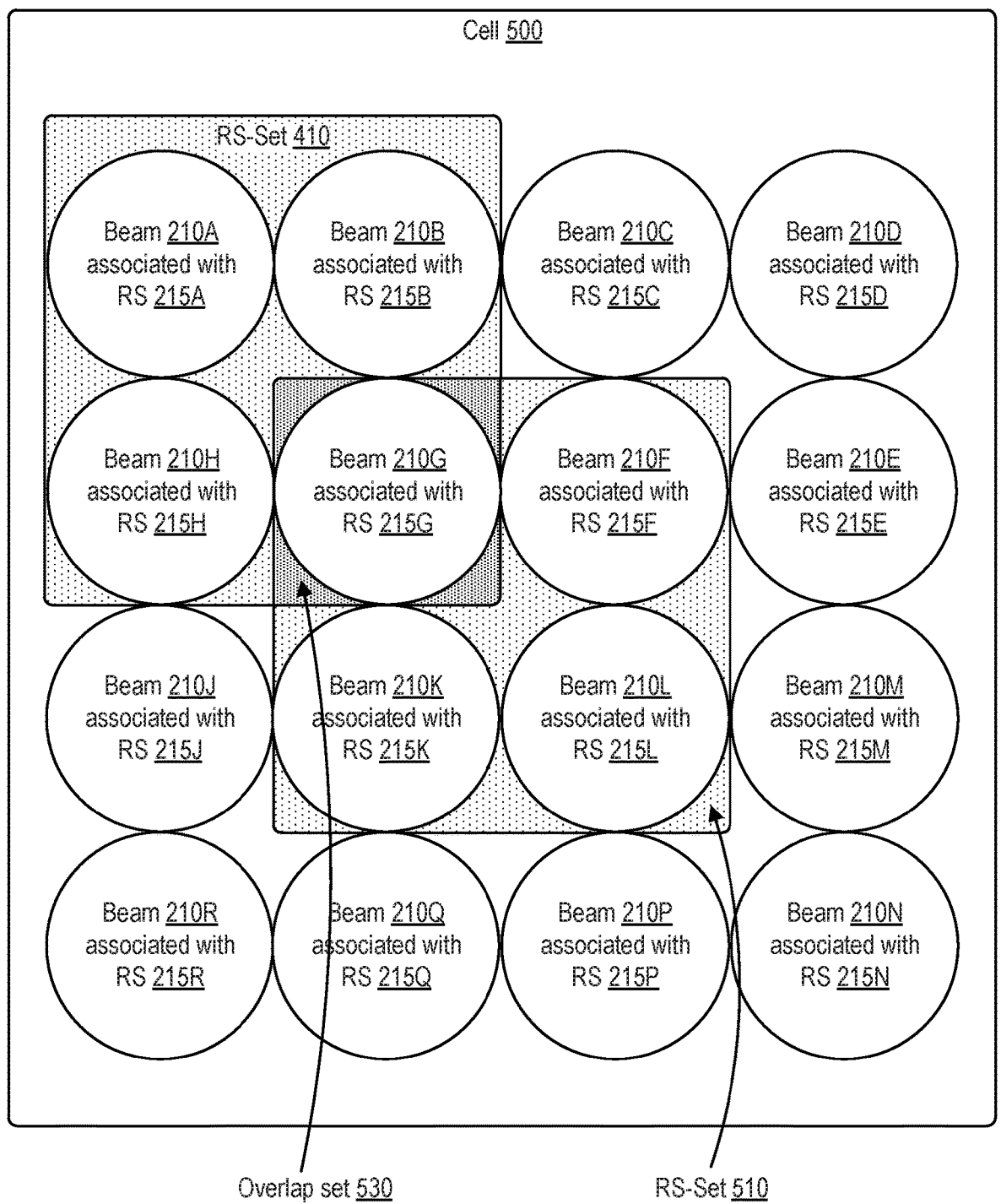
FIG. 5 is a cell with multiple beams that are each associated with a corresponding reference signal (RS), with two overlapping sets of beams and corresponding RSs identified as two RS-sets.

FIG. 5 is a cell with multiple beams that are each associated with a corresponding reference signal (RS), with two overlapping sets of beams and corresponding RSs identified as two RS-sets.

The cell 500 of FIG. 5 includes the same set of beams 210A-N and corresponding RSs 215A-N of the cell 200 of FIG. 2. The cell 500 includes two RS-sets: the first RS-set 410 of FIG. 4 and a third RS-set 510. The third RS-set 510 includes beam 210F associated with RS 215F, beam 210G associated with RS 215G, beam 210K associated with RS 215K, and beam 210L associated with RS 215L. Beams 210F, 210G, 210K, and 210L of the third RS-set 510 are each adjacent to one another and arranged in a two-by-two grid. The first RS-set 410 and the third RS-set 510 overlap at an overlap set 530 that includes the beam 210G associated with RS 215G. That is, the beam 210G associated with RS 215G is included in both the first RS-set 410 and the third RS-set 510.

Figure 6:
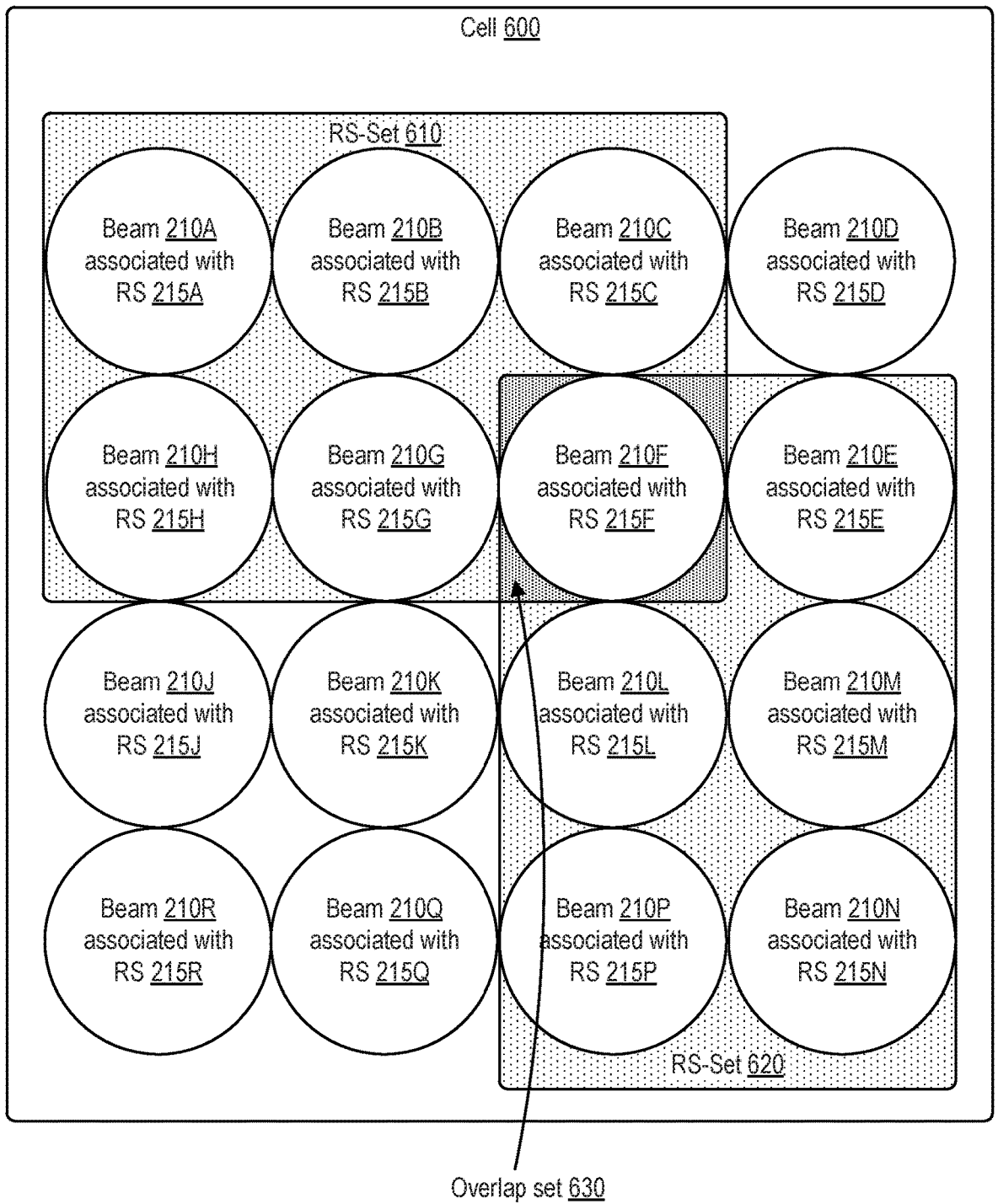
FIG. 6 is a cell with multiple beams that are each associated with a corresponding reference signal (RS), with two overlapping sets of beams and corresponding RSs identified as two RS-sets.

FIG. 6 is a cell with multiple beams that are each associated with a corresponding reference signal (RS), with two overlapping sets of beams and corresponding RSs identified as two RS-sets.

The cell 600 of FIG. 6 includes the same set of beams 210A-N and corresponding RSs 215A-N of the cell 200 of FIG. 2. The cell 600 includes two RS-sets: a fourth RS-set 610 and a fifth RS-set 620. The fourth RS-set 610 includes beam 210A associated with RS 215A, beam 210B associated with RS 215B, beam 210C associated with RS 215C, beam 210F associated with RS 215F, beam 210G associated with RS 215G, and beam 210H associated with RS 215H. Beams 210A, 210B, 210C, 210F, 210G, and 210H of the fourth RS-set 610 are each adjacent to one another and arranged in a three-by-two grid. The fifth RS-set 620 includes beam 210E associated with RS 215E, beam 210F associated with RS 215F, beam 210L associated with RS 215L, beam 210M associated with RS 215M, beam 210N associated with RS 215N, and beam 210P associated with RS 215P. Beams 210E, 210F, 210L, 210M, 210N, and 210P of the fifth RS-set 620 are each adjacent to one another and arranged in a two-by-three grid. The fourth RS-set 610 and the fifth RS-set 620 overlap at an overlap set 630 that includes the beam 210F associated with RS 215F. That is, the beam 210F associated with RS 215F is included in both the fourth RS-set 610 and the fifth RS-set 620.

Figure 7A:
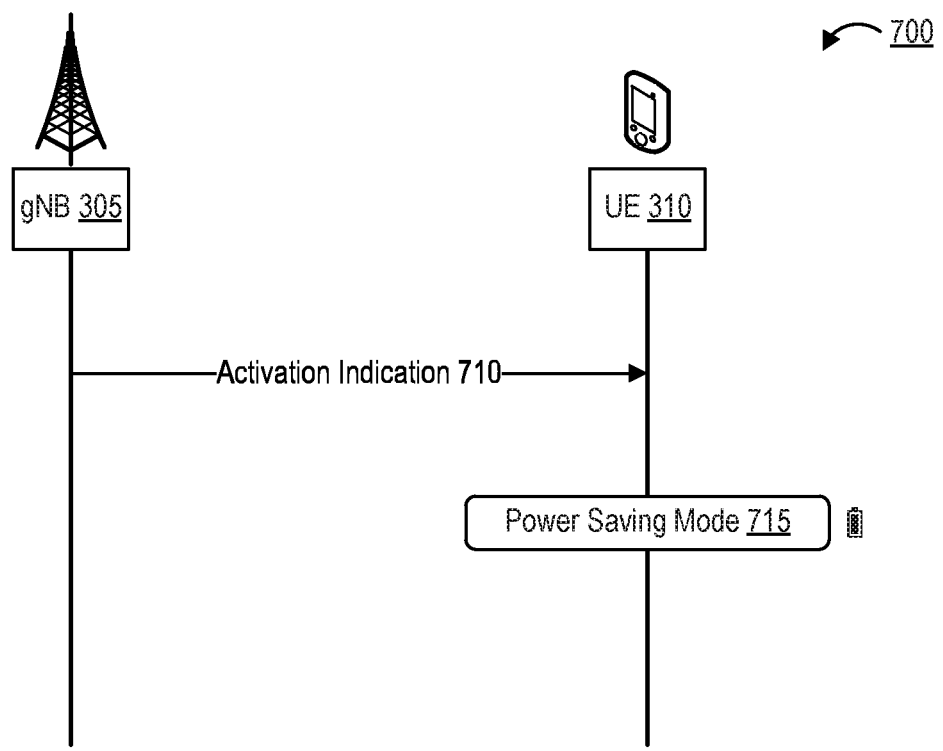
FIG. 7A illustrates an activation indication that initiates a power saving mode.

FIG. 7A illustrates an activation indication that initiates a power saving mode.

The process 700 of FIG. 7A is a simplified process showing that an activation indication 710 is sent from the gNB 305 to the UE 310, and received at the UE 310, before power saving mode 715 is activated at the UE 310. The gNB 305 and the UE 310 thus have a common understanding that power saving mode 715 is going to be activated. More specifically, the activation indication 710 may release the power saving mode 715 at the UE 310, for example via a "release" or a "deactivation" information element. The activation indication 710 may be sent from the gNB 305 to the UE 310 via Radio Resource Control (RRC), Medium Access Control (MAC) Control Element (CE), Downlink Control Information (DCI), or some combination thereof, as configured via a power saving configuration such as one of the power saving configurations 325, 330, 730, or 765.

During the power saving mode 715, the UE 310 may be configured to communicate with the gNB 305, including by sending measurement information. In some cases, the UE 310 may be configured to communicate with the gNB 305 via a transmission scheme using a single beam, a single signal antenna/panel, and/or a single signal layer. In some cases, the UE 310 may be configured to communicate with the gNB 305 via a transmission scheme using a single set of beams, a single set of signal antennae/panels, and/or a single set of signal layers. In some examples, the UE 310 may be configured to communicate with the gNB 305 via a limited maximum transport block size. In some examples, the UE 310 may be configured to communicate with the gNB 305 with an assumption that PDSCH is Quasi Co-Located (QCLed) with a first single target RS (e.g., configured by the gNB 305). That is, the UE 310 uses the same receiver or set of receivers to receive PDSCH data and the first single target RS (over the same beam or set of beams). In some examples, the UE 310 may be configured to communicate with the gNB 305 with an assumption that PDCCH is QCLed with a second single target RS (e.g., configured by the gNB 305). That is, the UE 310 uses the same receiver or set of receivers to receive PDCCH data and the second single target RS (over the same beam or set of beams). For instance, the first single RS and the second single RS may be the same RS or different RSs. In some cases, a target RS (e.g., the first single RS and/or the second single RS) may be pre-configured by the gNB 305.

Figure 7B:
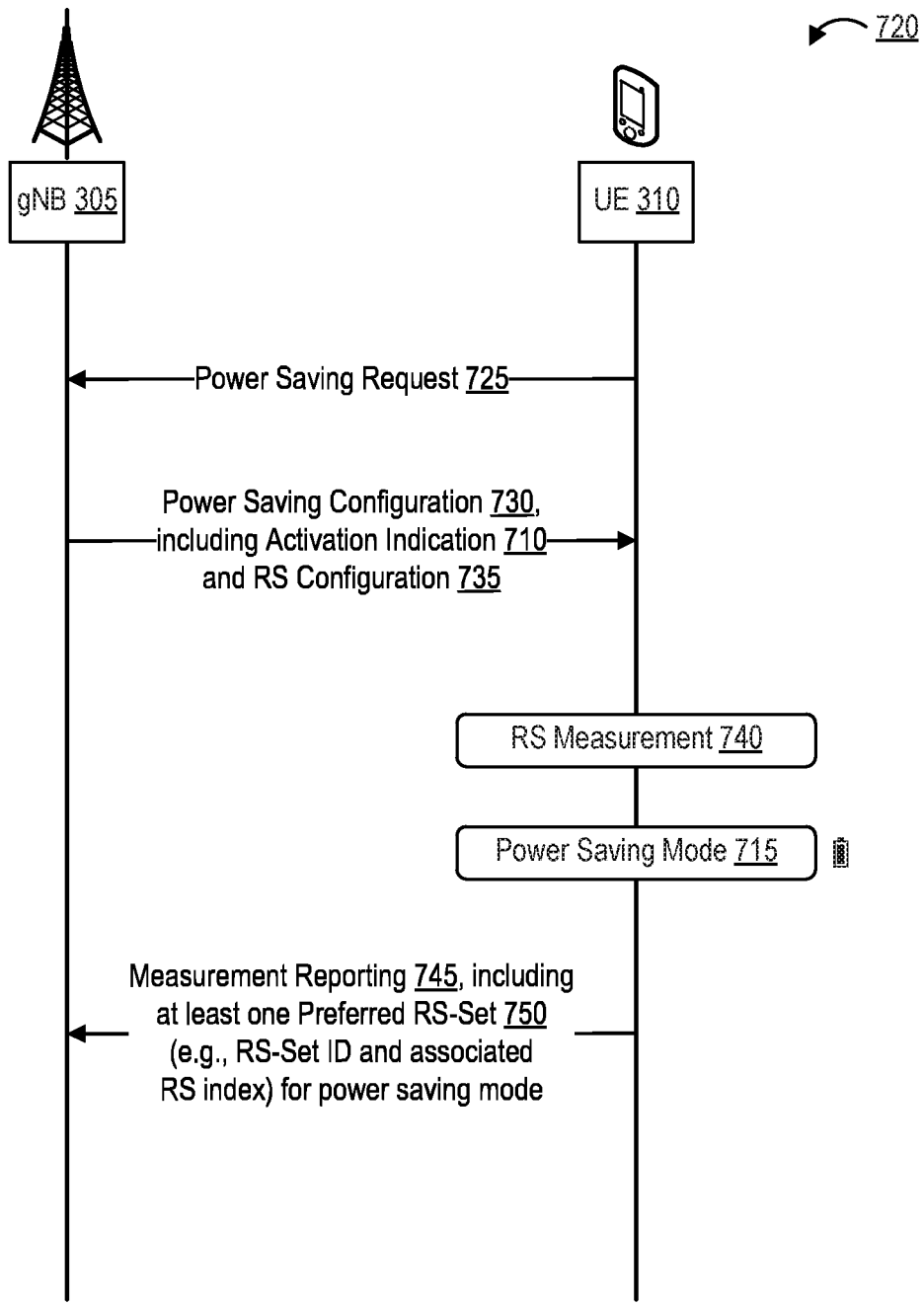
FIG. 7B illustrates an activation indication that initiates a power saving mode where activation of the power saving mode is requested by the UE.

FIG. 7B illustrates an activation indication that initiates a power saving mode where activation of the power saving mode is requested by the UE.

The process 720 of FIG. 7B illustrates a first example of how the UE 310 may enter power saving mode 715 following receipt of the activation indication 710. The process 720 begins with the UE 310 sending a power saving request 725 to the gNB 305, which receives the power saving request 725. The power saving request 725 may be a power saving request 320 as discussed with respect to the process 300. In response to receiving the power saving request 725, the gNB 305 may generate a power saving configuration 730 and send the power saving configuration 730 to the UE 310. The power saving configuration 730 may include the activation indication 710 and an RS configuration 735. As discussed above, the activation indication 710 allows the UE 310 to enter the power saving mode 715. The RS configuration 735 may include a list of RS-sets that the UE 310 can then select one or more preferred RS-set(s) from.

The UE 310 may receive the power saving configuration 730 after the gNB 305 sends the power saving configuration 730 to the UE 310. The UE 310 may then perform one or more RS measurement(s) 740 of one or more RSs. The RS measurement(s) 740 may include information related to signal strength and/or channel quality. For example, the RS measurement(s) 740 may measure and/or include Reference Signal Received Power (RSRP), Reference Signal Received Quality (RSRQ), Signal to Interference & Noise Ratio (SINR), path-loss, any combination thereof, and/or other information.

Based on the RS measurement(s) 740 of one or more RSs, the UE 310 may determine at least one preferred RS-set from the list provided by the RS configuration 735. For example, the UE 310 may select the at least one preferred RS-set from the list according to the channel quality of each RS. Channel quality of each RS may be measured according to, for example, RSRP, RSRQ, SINR, path-loss, any combination thereof, and/or other information related to channel quality. The UE 310 may select one preferred RS-set 750 for power saving mode 715 from the configured RS-sets in the list provided by the RS configuration 735 according to the power saving configuration 730 and/or the RS configuration 735.

The UE 310 may enter power saving mode 715 after, during, or before performing the RS measurement(s) 740. After performing the RS measurement(s) 740, the UE 310 may generate measurement reporting information 745 and may send the measurement reporting information 745 to the gNB 305. The measurement reporting information 745 may include the RS measurement(s) 740 measured by the UE 310. The measurement reporting information 745 may identify the at least one preferred RS-set 750 that the UE 310 selected for the power saving mode 715, for example by identifying an RS-Set ID and/or an associated RS index for the preferred RS-set 750. The gNB 305 may then receive the measurement reporting information 745 from the UE 310 and may configure itself and its connection with the UE 310 for the power saving mode, so that the gNB 305 uses at least one beam (and associated RS) in the preferred RS-set 750 for communications with the UE 310 while in power saving mode.

Figure 7C:
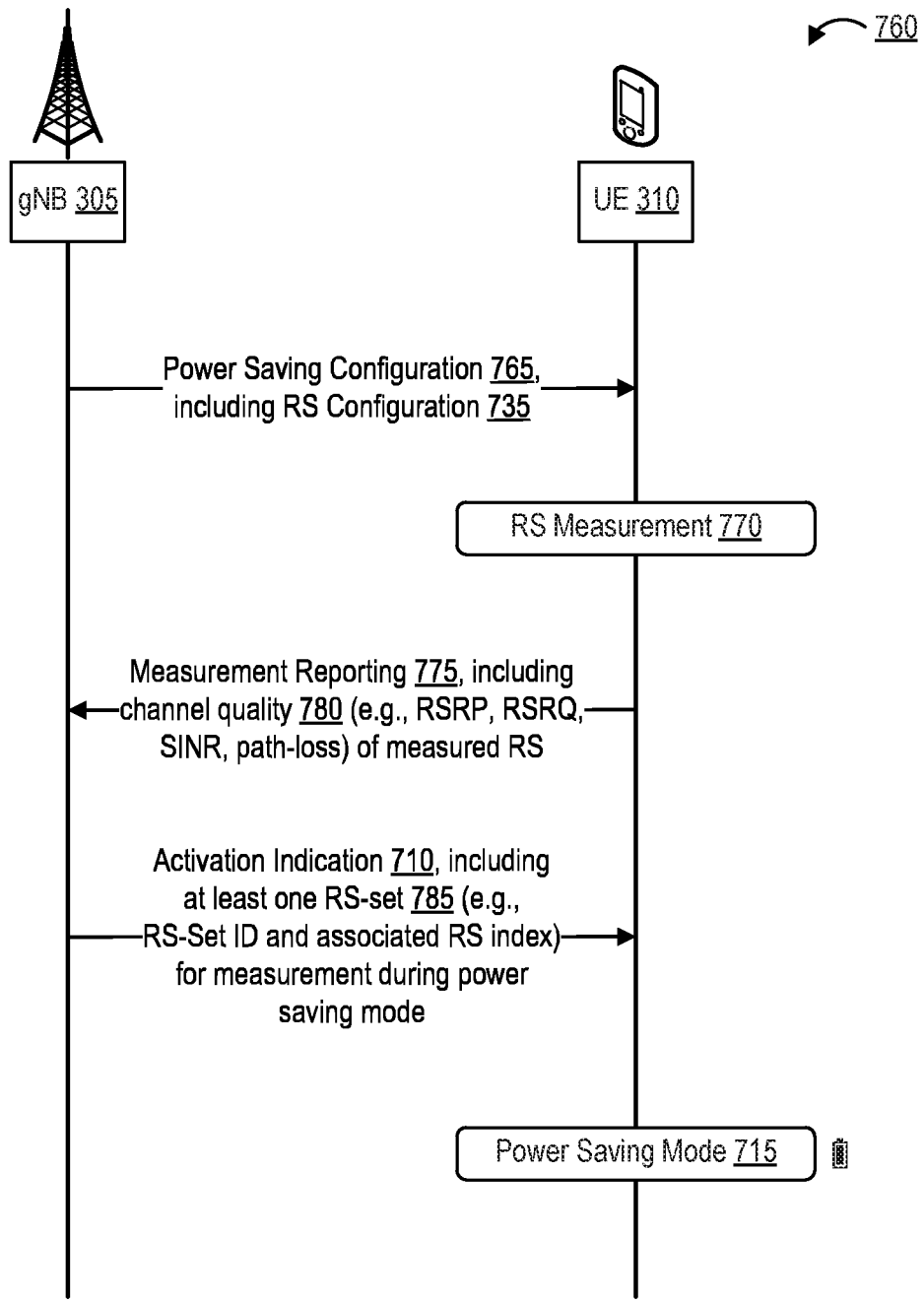
FIG. 7C illustrates an activation indication that initiates a power saving mode where activation of the power saving mode is configured by the gNB.

FIG. 7C illustrates an activation indication that initiates a power saving mode where activation of the power saving mode is configured by the gNB.

The process 760 of FIG. 7C illustrates a second example of how the UE 310 may enter power saving mode 715 following receipt of the activation indication 710. The process 760 begins with the gNB 305 generating and sending a power saving configuration 765 to the UE 310, which the UE 310 receives. The power saving configuration 765 may include the RS configuration 735, which may list RS-sets. Following receipt of the power saving configuration 765 at the UE 310, the UE 310 performs one or more RS measurement(s) 770, similar to the one or more RS measurement(s) 740 in FIG. 7B. The RS measurement(s) 770 may include information related to signal strength and/or channel quality, and may for example measure and/or include RSRP, RSRQ, SINR, path-loss, any combination thereof, and/or other information. Based on the RS measurement(s) 770 of one or more RS s, the UE 310 may determine a channel quality 780 of the RS(s) measured by the RS measurement(s) 770, for example measured based on RSRP, RSRQ, SINR, path-loss, any combination thereof, and/or other information.

After performing the RS measurement(s) 770, the UE 310 may generate measurement reporting information 775 and may send the measurement reporting information 775 to the gNB 305. The measurement reporting information 775 may include the RS measurement(s) 770 measured by the UE 310. The measurement reporting information 775 may identify the channel quality 780 determined by the UE 310. The gNB 305 receives the measurement reporting information 775. Based on the measurement reporting information 775, the gNB 305 generates an activation indication 710, which in this case includes at least one selected RS-set 785 for use with power saving mode 715 that the gNB 305 selects based on the measurement reporting information 775 (e.g., based on the channel quality 780). The gNB 305 may configure itself and its connection with the UE 310 for the power saving mode 715, so that the gNB 305 uses at least one beam (and associated RS) in the selected RS-set 785 for communications with the UE 310 while in power saving mode 715. Once the UE 310 receives the activation indication 710, the UE 310 enters the power saving mode 715. In some cases, the UE 310 performs one or more measurement(s) (e.g., CSI measurement(s), and/or other measurement) and/or reports those measurements (e.g., in a CSI report, and/or other report) for at least the selected RS-set 785.

Figure 8:
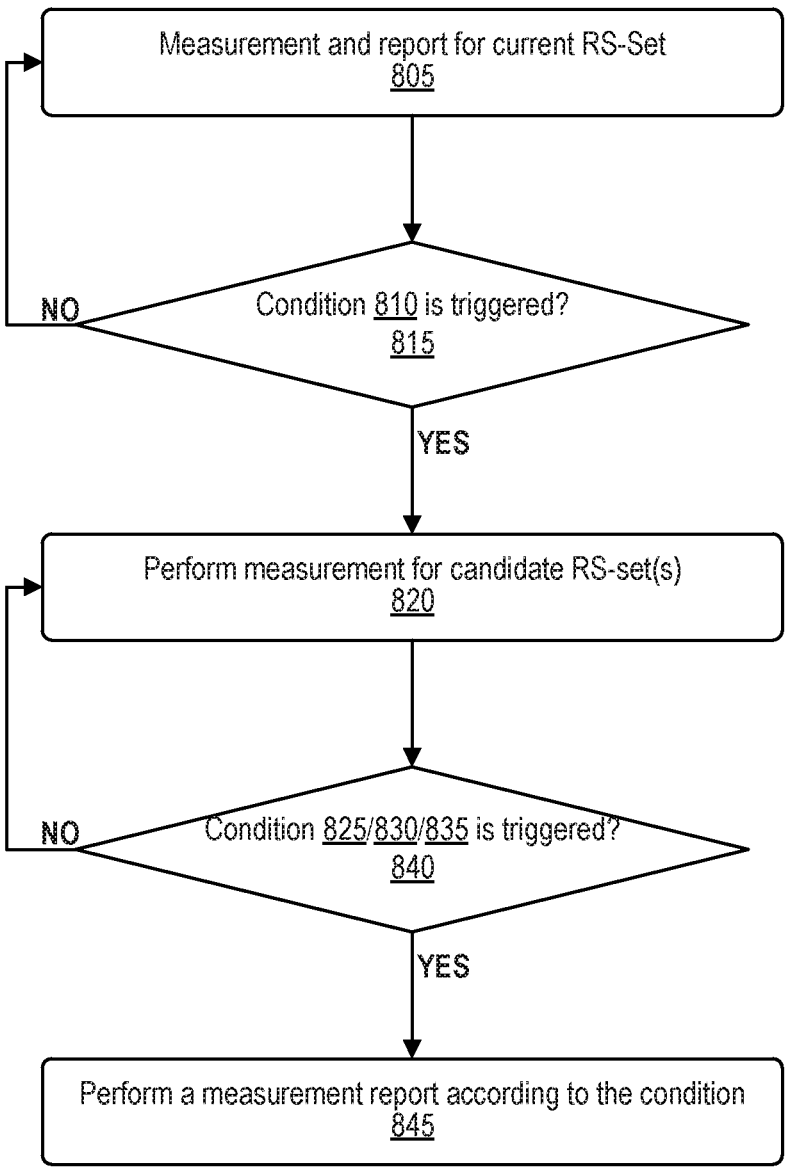
FIG. 8 is a flow diagram illustrating measurement and measurement reporting based on a set of multiple conditions.

FIG. 8 is a flow diagram illustrating measurement and measurement reporting based on multiple conditions.

The UE 310 may perform measurement(s) for a current RS-set, which may be indicated by the gNB 305 (as in the process 760 of FIG. 7B). The UE 310 may in some cases be triggered to perform measurement(s) for candidate RS-set(s) upon certain triggering conditions. Candidate RS-set(s) and associated RS may be pre-determined by the gNB 305 via the power saving configuration 325/330/730/765 and/or the RS configuration 735. For example, triggering conditions may be used to initiate measurement reporting and/or to trigger updating and/or re-selection of the current RS-set.

The flow diagram 800 of FIG. 8 represents a first option for condition-based measurement and measurement reporting. At block 805, the UE 310 performs one or more measurement(s) for one or more RS(s) for the current RS-Set, generates a measurement report identifying the measurement(s), and sends the measurement report to the gNB 305. At block 815, the UE 310 and/or the gNB 305 checks whether a first condition 810 is triggered. If the first condition 810 is not triggered, block 815 is followed by block 805. If the first condition 810 is triggered, block 815 is followed by block 820.

At block 820, the UE 310 performs one or more measurement(s) for one or more RS(s) for one or more candidate RS-Set(s). The UE 310 may perform the measurement(s) for the current RS-set and for the one or more candidate RS-set(s) with the same periodicity, or with different periodicity. In some cases, only a subset of the possible candidate RS-set(s) may be measured, which may be based on the priority of RS-set(s) as discussed below with respect to the cell 1000 of FIG. 10. Similarly, order of measurement of the candidate RS-set(s) may be determined by priority.

At block 840, the UE 310 and/or the gNB 305 checks whether a second condition 825, a third condition 830, and/or a fourth condition 835 are triggered/satisfied to identify whether a candidate RS-set has a good channel quality (e.g., relative to the current RS-set). One or more of the second condition 825, the third condition 830, and/or the fourth condition 835 can be used by the UE 310 and/or the gNB 305 to determine whether the candidate RS-set has good channel quality. For instance, as discussed further below, a candidate RS-set may be judged not to have good channel quality when the second condition 825 and/or the third condition 830 are not satisfied, and/or when the fourth condition 835 is satisfied. In such cases, when the candidate RS-set is determined not to have good channel quality based on one or more of the second condition 825, the third condition 830, and/or the fourth condition 835, block 840 is followed by block 820. On the other hand, a candidate RS-set may be judged to have good channel quality when the second condition 825 is satisfied, when the third condition 830 is satisfied, and/or when the fourth condition 835 is no longer satisfied. In such cases, block 840 is followed by block 845.

At block 845, the UE 310 performs a measurement report according to the condition(s) that were found to be triggered at block 840. At block 845, the UE 310 can perform the measurement report based on a candidate RS-set that is selected to replace the current RS-set based on the second condition 825, the third condition 830, and/or the fourth condition 835 being satisfied. For instance, the UE 310 can generate a measurement report at block 845 identifying the measurement(s) for one or more RS(s) for the selected candidate RS-Set. The UE 310 may send the measurement report to the gNB 305. In some cases, the UE 310 can generate the measurement report identifying the measurement(s) of one or more RS(s) of one or more candidate RS-Set(s) at block 820 (prior to determining whether one or more of the second condition 825, the third condition 830, and/or the fourth condition 835 is/are satisfied). In such cases, the UE 310 can send the previously-generated measurement report at block 845 for the one or more RSs of the selected candidate RS-Set once the condition(s) are determined to be satisfied at block 840.

The first condition 810 is that a channel quality of the current RS-set becomes worse than (e.g., less than) a predetermined first threshold A1. For example, the UE 310 can determine that the channel quality of the current RS-set is less than the first threshold A1, or has reached the first threshold A1 after decreasing. The UE 310 may consider the channel quality of the current RS-set to fall below the first threshold A1 if, for example the measurement result (e.g., as measured at block 805) (e.g., RSRP, RSRQ, SINR and/or CQI) of at least one RS in the current RS-set is below the first threshold A1. Where measurement results for more than one RS of the current RS-set are used, an average may be taken of the measurement results for each RS, and the first condition 810 may be based on whether the average falls below the first threshold A1. The number of RSs to use and/or the average may be configured by the gNB 305 and/or determined according to the number of beams/RSs in the RS-set.

In some cases, the first condition 810 may require that the measurement result of at least one RS in the current RS-set is worse than the first threshold A1 for at least a predetermined time period $W_{A1}$ (e.g., configured by RRC, MAC CE, and/or DCI). For example, the predetermined time period $W_{A1}$ may be an amount of time falling within a range of time from 0.5 milliseconds (ms) to 400 ms, the amount of time selected from the range in some cases with a 0.5 ms resolution. In some cases, a number of measurement results for at least one RS in the current RS-set that are worse than the first threshold A1 must exceed a threshold $N_{A1}$ (e.g., configured by RRC, MAC CE and/or DCI) to satisfy the first condition 810. The threshold $N_{A1}$ may be expressed in units of measurement samples. A range for the measurement samples may be defined from 1 sample to 100 samples with 1 sample resolution, and in some cases the threshold $N_{A1}$ may fall within that range. The threshold $N_{A1}$ may alternately be expressed in units of a percentage of sample. A range for a percentage of sample may be defined from 0.1 percentage to 100 percentage with 0.1 percentage resolution, and in some cases the threshold $N_{A1}$ may fall within that range.

The second condition 825 is that a channel quality of at least one candidate RS-set becomes better than (e.g., greater than) the channel quality for the current RS-set by at least a predetermined offset threshold A2. The UE 310 may consider the channel quality of a candidate RS-set to exceed the channel quality for the current RS-set by at least the offset threshold A2 if, for example the measurement result (e.g., as measured at block 820) (e.g., RSRP, RSRQ, SINR and/or CQI) of at least one RS in the candidate RS-set exceeds the measurement result (e.g., as measured at block 804) (e.g., RSRP, RSRQ, SINR and/or CQI) of at least one RS in the current RS-set by at least the offset threshold A2. Where measurement results for more than one RS are used for the candidate RS-set and/or for the current RS-set, an average of multiple measurement results for multiple RSs in the candidate RS-set may be used as the channel quality for the candidate RS-set for the purpose of checking the second condition 825, and an average of multiple measurement results for multiple RSs in the current RS-set may be used as the channel quality for the current RS-set for the purpose of checking the second condition 825. The number of RSs to use and/or average in the candidate RS-set and/or in the current RS-set may be configured by the gNB 305 and/or determined according to the number of beams/RSs in the candidate RS-set and/or in the current RS-set. The second threshold A2 may be different from the first threshold A1, but may fall within any of the dB and/or dBM ranges discussed with respect to the first threshold A1. In one example, the second threshold A2 may fall within a range of values defined from −15 dB to 15 dB, with a 0.5 dB resolution.

In some cases, the second condition 825 may require that the measurement result of at least one RS in at least one candidate RS-set is better than the better than (e.g., greater than) the channel quality for the current RS-set by at least the predetermined offset threshold A2 for at least a predetermined time period $W_{A2}$ (e.g., configured by RRC, MAC CE and/or DCI). The predetermined time period $W_{A2}$ can be the same or different than the predetermined time period $W_{A1}$, and may fall within any of the value ranges discussed with respect to the predetermined time period $W_{A1}$. In some cases, a number of measurement results for at least one RS in the at least one candidate RS-set that are better than (greater than) the channel quality for the current RS-set by at least the predetermined offset threshold A2 must exceed a threshold $N_{A2}$ (e.g., configured by RRC, MAC CE and/or DCI) to satisfy the second condition 825. The threshold $N_{A2}$ can be the same or different than the threshold $N_{A1}$, and may fall within any of the value ranges discussed with respect to the threshold $N_{A1}$.

The third condition 830 is that a channel quality of at least one candidate RS-set becomes better than a predetermined third threshold A3. For example, the UE 310 can determine that the channel quality of at least one candidate RS-set exceeds the third threshold A3, or reaches the third threshold A3 after increasing. The UE 310 may consider the channel quality of a candidate RS-set to exceed the third threshold A3 if, for example, the measurement result (e.g., as measured at block 820) (e.g., RSRP, RSRQ, SINR and/or CQI) of at least one RS in the candidate RS-set is greater than the third threshold A3. Where measurement results for more than one RS are used, an average may be taken of the measurement results for each RS, and the third condition 830 may be based on whether the average exceeds the third threshold A3. The number of RSs to use and/or average may be configured by the gNB 305 and/or determined according to the number of beams/RSs in the candidate RS-set. The third threshold A3 may be different from the first threshold A1 and/or the second threshold A2, but may fall within any of the dB and/or dBM ranges discussed with respect to the first threshold A1 and/or the second threshold A2. In one example, the third threshold A3 may fall within a range of values defined from −15 dB to 15 dB, with a 0.5 dB resolution.

In some cases, the third condition 830 may require that the measurement result of at least one RS in at least one candidate RS-set is worse than the third threshold A3 for at least a predetermined time period $W_{A3}$ (e.g., configured by RRC, MAC CE and/or DCI). The predetermined time period $W_{A3}$ can be the same or different than one or both of the predetermined time periods $W_{A1}$ and/or $W_{A2}$, and may fall within any of the time value ranges discussed with respect to the predetermined time period $W_{A1}$. In some cases, a number of measurement results for at least one RS in at least one candidate RS-set that are worse than the third threshold A3 must exceed a threshold $N_{A3}$ (e.g., configured by RRC, MAC CE and/or DCI) to satisfy the third condition 830. The threshold $N_{A3}$ can be the same or different than one or both of the thresholds $N_{A1}$ and/or $N_{A2}$, and may fall within any of the value ranges discussed with respect to the threshold $N_{A1}$.

The fourth condition 835 is that a channel quality of at least one candidate RS-set becomes worse than a predetermined fourth threshold A4. For example, the UE 310 can determine that the channel quality of at least one candidate RS-set is less than the fourth threshold A4, or reaches the fourth threshold A4 after decreasing. The UE 310 may consider the channel quality of a candidate RS-set to fall below the fourth threshold A4 if, for example, the measurement result (e.g., as measured at block 820) (e.g., RSRP, RSRQ, SINR and/or CQI) of at least one RS in the candidate RS-set is below the fourth threshold A4. Where measurement results for more than one RS are used, an average may be taken of the measurement results for each RS, and the fourth condition 835 may be based on whether the average falls below the fourth threshold A4. The number of RSs to use and/or the average may be configured by the gNB 305 and/or determined according to the number of beams/RSs in the RS-set. The fourth threshold A4 may be different from the first threshold A1 and/or the second threshold A2 and/or the third threshold A3, but may fall within any of the dB and/or dBM ranges discussed with respect to the first threshold A1 and/or the second threshold A2 and/or the third threshold A3. In one example, the fourth threshold A4 may fall within a range of values defined from −15 dB to 15 dB, with a 0.5 dB resolution.

In some cases, the fourth condition 835 implies that the current RS-set and/or any candidate RS-set configured for the UE is not good enough to communicate with gNB, since the channel quality falls below the fourth threshold A4. The gNB may need to re-configure RS-sets for the UE.

In some cases, the fourth condition 835 may require that the measurement result of at least one RS in at least one candidate RS-set is worse than the fourth threshold A4 for at least a predetermined time period $W_{A4}$ (e.g., configured by RRC, MAC CE and/or DCI). The predetermined time period $W_{A4}$ can be the same or different than one or more of the predetermined time periods $W_{A1}$, $W_{A2}$, and/or $W_{A3}$, and may fall within any of the time value ranges discussed with respect to the predetermined time period $W_{A1}$. In some cases, a number of measurement results for at least one RS in the at least one candidate RS-set that are worse than the fourth threshold A4 must exceed a threshold $N_{A4}$ (e.g., configured by RRC, MAC CE and/or DCI) to satisfy the fourth condition 835. The threshold $N_{A4}$ can be the same or different than one or more of the thresholds $N_{A1}$, $N_{A2}$, and/or $N_{A3}$, and may fall within any of the value ranges discussed with respect to the threshold $N_{A1}$.

In some cases, the fourth condition 835 may be used in situations similar to those in which the second condition 825 and the third condition 830 are used; however, instead of triggering a change in RS-set when the fourth condition 835 is satisfied, a change in RS-set may be triggered when the fourth condition 835 is no longer satisfied. For example, when the fourth condition 835 is no longer satisfied for a particular candidate RS-set, the UE 310 knows that the candidate RS-set has a channel quality that is equal to or better than the fourth threshold A4. In some cases, satisfaction of the fourth condition 835 may cause the UE 310 to identify that the channel quality for all candidate RS-sets has decreased.

Figure 9:
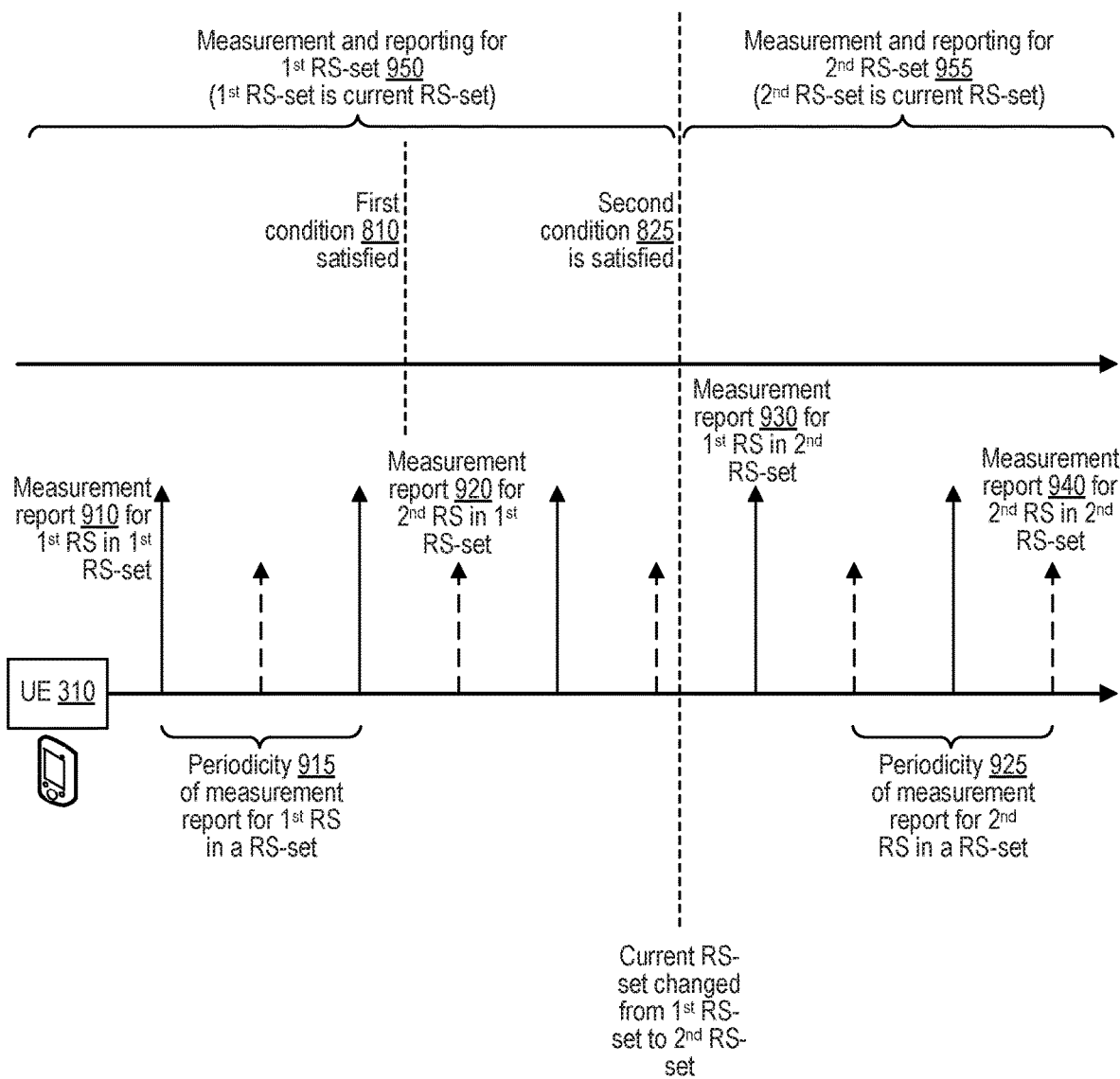
FIG. 9 illustrates measurement reporting along a timeline along which certain conditions are satisfied.

FIG. 9 illustrates measurement reporting along a timeline along which certain conditions are satisfied.

The timeline diagram 900 of FIG. 9 illustrates measurement reporting by the UE 310 along a horizontal timeline, with time moving forward as the timeline progresses from the left side of the diagram 900 to the right side of the diagram 900. Vertical arrows extending from the timeline and pointing upward (toward the top of the diagram 900) represent transmissions from the UE 310 to the gNB 305, and more specifically represent measurement reports for particular RSs in a current RS-set.

Starting from the left side of the timeline diagram 900, the longer solid vertical arrows represent measurement reports 910 (e.g., CSI reports or other reports as described herein) for a first RS in a first RS-set, while the shorter dashed vertical arrows represent measurement reports 920 (e.g., CSI reports or other reports as described herein) for a second RS in the first RS-set. While measurement reports are shown in FIG. 9 for two RSs of the first RS-set, one of skill will appreciate that more measurement reports can be generated and reported. The measurement reports 910 for the first RS in the first RS-set repeat at a periodicity 915 of measurement reports for the first RS in the first RS-set. The measurement reports 920 for the second RS in the first RS-set repeat at a periodicity 925 of measurement reports for the second RS in the first RS-set. In a power saving mode, the periodicity 915 may be equal to the periodicity 925. In some cases, only one set of configurations (e.g., periodicity) may be configured/activated for measurement reporting (e.g., for CSI reporting) during the power saving mode. In some cases, only one uplink resource (e.g., physical uplink control channel (PUCCH), physical uplink shared channel (PUSCH), and/or other uplink resource) may be configured/activated for measurement reporting (e.g., for CSI reporting) during the power saving mode.

Going from left to right in the timeline diagram 900, eventually a point in time (indicated by a dashed line) is reached on the timeline at which the first condition 810 is satisfied, meaning that the channel quality of the current RS-set—that is, of the first RS-set—has fallen to and/or below a first threshold A1. As indicated in block 820 of the flow diagram 800 of FIG. 8, the UE 310 begins to also perform measurements for one or more candidate RS-set(s) after the first condition 810 is satisfied. Going even further from left to right in the timeline diagram 900, eventually a second point in time (indicated by a second dashed line) is reached on the timeline at which the second condition 825 is satisfied, meaning that the channel quality of one or more candidate RS-sets (in the example of FIG. 9, at least a second RS-set) exceeds the channel quality of the current RS-set (the first RS-set) by at least an offset threshold A2.

In response to satisfaction of the second condition 825, the current RS-set is changed from the first RS-set to the second RS-set, which has better channel quality than the first RS-set. Thus, in the area 950 to the left of the second dashed vertical line representing the satisfaction of the second condition 825, the vertical arrows represent measurement and measurement reporting for the first RS-set. In contrast, in the area 955 to the right of the second dashed vertical line representing the satisfaction of the second condition 825, the vertical arrows represent measurement and measurement reporting for the second RS-set. Within the area 955 to the right of the second dashed vertical line representing the satisfaction of the second condition 825, the longer solid vertical arrows represent measurement reports 930 (e.g., CSI reports) for the first RS in the second RS-set, while the shorter dashed vertical arrows represent measurement reports 940 (e.g., CSI reports) for the second RS in the second RS-set. The measurement reports 930 for the first RS in the second RS-set repeat at the periodicity 915 of measurement reports for the first RS in a RS-set. The measurement reports 940 for the second RS in the second RS-set repeat at the periodicity 925 of measurement reports for the second RS in a RS-set.

As described above, the UE 310 can send one or more measurement reports for a current RS-set, and can switch to a candidate RS-set if one or more conditions are satisfied, after which the UE 310 can begin sending one or more measurement reports for the candidate RS-set the UE 310 has switched to. Each measurement report may be transmitted via physical layer signaling, MAC CE, RRC message, another form of signaling, or any combination thereof. A measurement report, such as a CSI report, may in some cases include an identity of the current RS-set and/or of the RS to which the measurement pertains, in addition to the measurement result of the RS (e.g., RSRP, RSRQ, SINR, etc.). A measurement report may also include information such as a condition identifier, for example identifying whether or not the first condition 810 is satisfied, whether or not the second condition 825 is satisfied, whether or not the third condition 830 is satisfied, whether or not the fourth condition 835 is satisfied, or some combination thereof. A measurement report may identify one or more candidate RS-sets, such as those that are preferred or that have a higher priority, or those that have been measured, or those whose channel quality satisfies the second condition 825, the third condition 830, the fourth condition 835, or some combination thereof. A measurement report may also include information such as channel quality of one or more RS-set candidates (e.g., RSRP, RSRQ, SINR, CSI). A CSI may include, for example, Pre-coding Matrix Indicator (PMI), Channel Quality Indicator (CQI), Rank Indicator (RI), Layer 1 (L1) measurements (e.g., L1-RSRP, L1-RSRQ, and/or L1-SINR), or some combination thereof.

In some cases, the second condition 825 in FIG. 9 may be replaced by the third condition 830 without any change in functionality otherwise. That is, the text reading "second condition 825 is satisfied" in the diagram 900 may be replaced by text reading "third condition 830 is satisfied." In some cases, the second condition 825 in FIG. 9 may be replaced by the fourth condition 835, with the "satisfied" changed to "not satisfied." That is, the text reading "second condition 825 is satisfied" in the diagram 900 may be replaced by text reading "fourth condition 835 is not satisfied" or "fourth condition 835 is no longer satisfied." In some cases, more than one of the second, third, and/or fourth conditions 825, 830, 835 can be used in combination, such as requiring more than one of the conditions to be satisfied before switching from the first RS-set to the second RS-set. For example, the second and third conditions can be used together, the second and fourth conditions can be used together, the third and fourth conditions can be used together, or the second, third, and fourth conditions can be used together.

Figure 10:
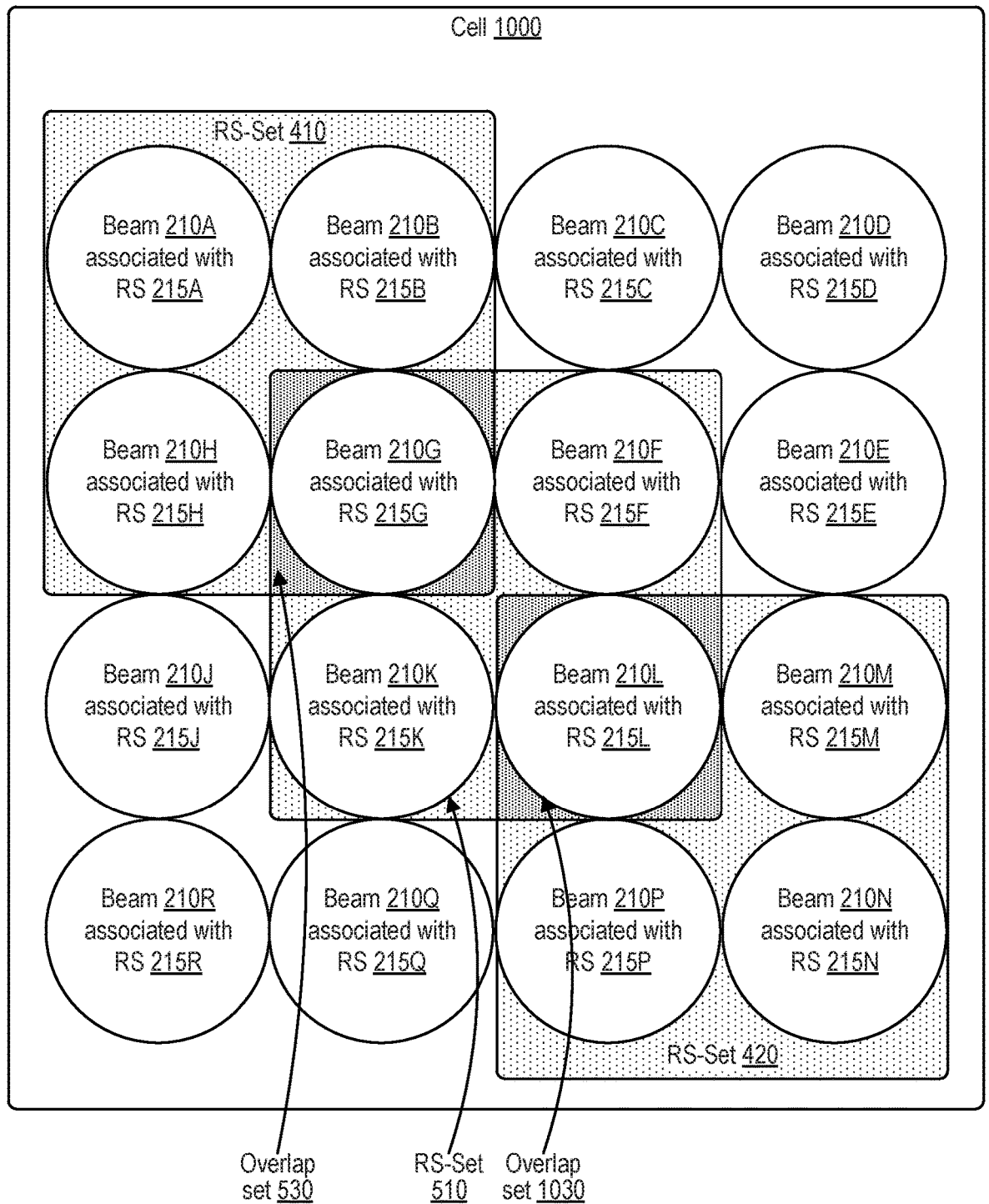
FIG. 10 is a cell with multiple beams that are each associated with a corresponding reference signal (RS), with three overlapping RS-sets that each have different priority levels.

FIG. 10 is a cell with multiple beams that are each associated with a corresponding reference signal (RS), with three overlapping RS-sets that each have different priority levels.

The cell 1000 of FIG. 10 includes the same set of beams 210A-N and corresponding RSs 215A-N of the cell 200 of FIG. 2. The cell 1000 includes three RS-sets: the first RS-set 410 of FIG. 4, the second RS-set 420 of FIG. 4, and the third RS-set 510 of FIG. 5. The first RS-set 410 and the third RS-set 510 overlap at an overlap set 530 that includes the beam 210G associated with RS 215G. That is, the beam 210G associated with RS 215G is included in both the first RS-set 410 and the third RS-set 510. The second RS-set 420 and the third RS-set 510 overlap at an overlap set 1030 that includes the beam 210L associated with RS 215L. That is, the beam 210L associated with RS 215L is included in both the second RS-set 420 and the third RS-set 510.

A UE 310 may be configured (e.g., by the gNB 305 and/or by the UE 310 based on information from the gNB 305) with a priority of candidate RS-sets according to the current RS-set, for starting measurement of candidates RS-sets. For example, if the current RS-set in the cell 1000 is the first RS-set 410, the third RS-set 510 may have higher priority as a candidate RS-set than the second RS-set 420 has as a candidate RS-set because the third RS-set 510 is closer to the first RS-set 410 than the second RS-set 420 is to the first RS-set 410. For example, as shown, the first RS-set 410 and the third RS-set 510 have a higher spatial domain correlation in the cell 1000 than do the first RS-set 410 and the second RS-set 420. The spatial domain correlation may be determined by the gNB 305 and used as a basis for establishing the order of the priority of candidate RS-sets for the UE 310. Priority may instead or in addition be based on RS-sets that are QCLed, in that the same receiver(s) can be used by the UE 310 to receive RSs from those RS-sets. Priority may instead or in addition be based on shared beams, such as the overlap 530 between the first RS-set 410 and the third RS-set 510. Basing the priority on the spatial domain correlation, whether RS-sets are QCLed, and/or sharing of beams can enhance the power savings of the UE 310.

The gNB 305 may send the priority of the candidate RS-sets to the UE 310, which may receive the priority and act based on the priority. For example, once the first condition 810 is satisfied, the UE 310 may start performing measurements for one or more candidate RS-sets in order based on the priority of the one or more candidate RS-sets. For example, if the current RS-set in the cell 1000 is the first RS-set 410, and the third RS-set 510 has a higher priority as a candidate RS-set than the second RS-set 420, then the UE 310 may perform measurement(s) for the third RS-set 510 first before performing measurement(s) for the second RS-set 420. If the measurement(s) for the third RS-set 510 satisfy the second condition 825 and/or the third condition 830 (and/or do not satisfy the fourth condition 835), the UE 310 may stop measuring other candidate RS-sets with lower priority (in this example, the second RS-set 420). If the measurement(s) for the third RS-set 510 do not satisfy the second condition 825 and/or the third condition 830 (and/or do satisfy the fourth condition 835), the UE 310 may continue measuring other candidate RS-sets with lower priority (in this example, the second RS-set 420) in order of priority.

In some implementations, when the UE 310 may decide to perform measurement on at least one candidate RS-set (e.g., when the first condition 810 is satisfied), the UE 310 may first select a first candidate RS-set (or RS) which is QCLed with current RS-set, which can help reduce power consumption by preventing the need to switch to a different receiver (and associated beam). If the first candidate RS-set cannot satisfy a condition (e.g., A2), the UE 310 may select a second candidate RS-set which is not QCLed with current RS-set.

In some implementations, when the UE 310 may decide to perform measurement on at least one candidate RS-set (e.g., when the first condition 810 is satisfied), the UE 310 may first select a first candidate RS-set (or RS) which is received via a same beam (e.g., spatial filter) or panel with the current RS-set. Such implementations can help reduce power consumption by preventing the need to switch to a different receiver (and associated beam) or panel. If the first candidate RS-set cannot satisfy a condition (e.g., A2), the UE 310 may select a second candidate RS-set which is not received via the same beam (e.g., spatial filter) or panel with the current RS-set.

Note that measurements for an RS-set refer to measurements for each RS of the RS-set. For example, since each of the RS-sets of the cell 1000 include four beams/RSs, the measurements for an RS-set refer to measurements for all four RSs of the RS-set. In some cases, the measurement results for all four RSs of the RS-set may be averaged to represent a measurement result for the entire RS-set (e.g., an average value defining an average of all RS measurements for an RS-set). Alternately, a maximum or minimum measurement result may be used to represent the RS-set. The maximum measurement result can include the maximum RS measurement result out of all RS measurement results for the RSs in an RS-set. The minimum measurement result can include the minimum RS measurement result out of all RS measurement results for the RSs in an RS-set.

In some cases, the UE 310 may not perform CSI measurement (e.g., if it is triggered by a CSI request via UL grant DCI). The UE 310 may not update the CSI (e.g., if it is triggered by a CSI request via UL grant DCI). The UE 310 may transmit the CSI with a predetermined level (e.g., CQI=0) (e.g., if it is triggered by a CSI request via UL grant DCI). For example, the UE 310 may provide the gNB 305 with a default or blank response where it has not performed measurements, for example due to the UE 310 being in the power saving mode.

Figure 11:
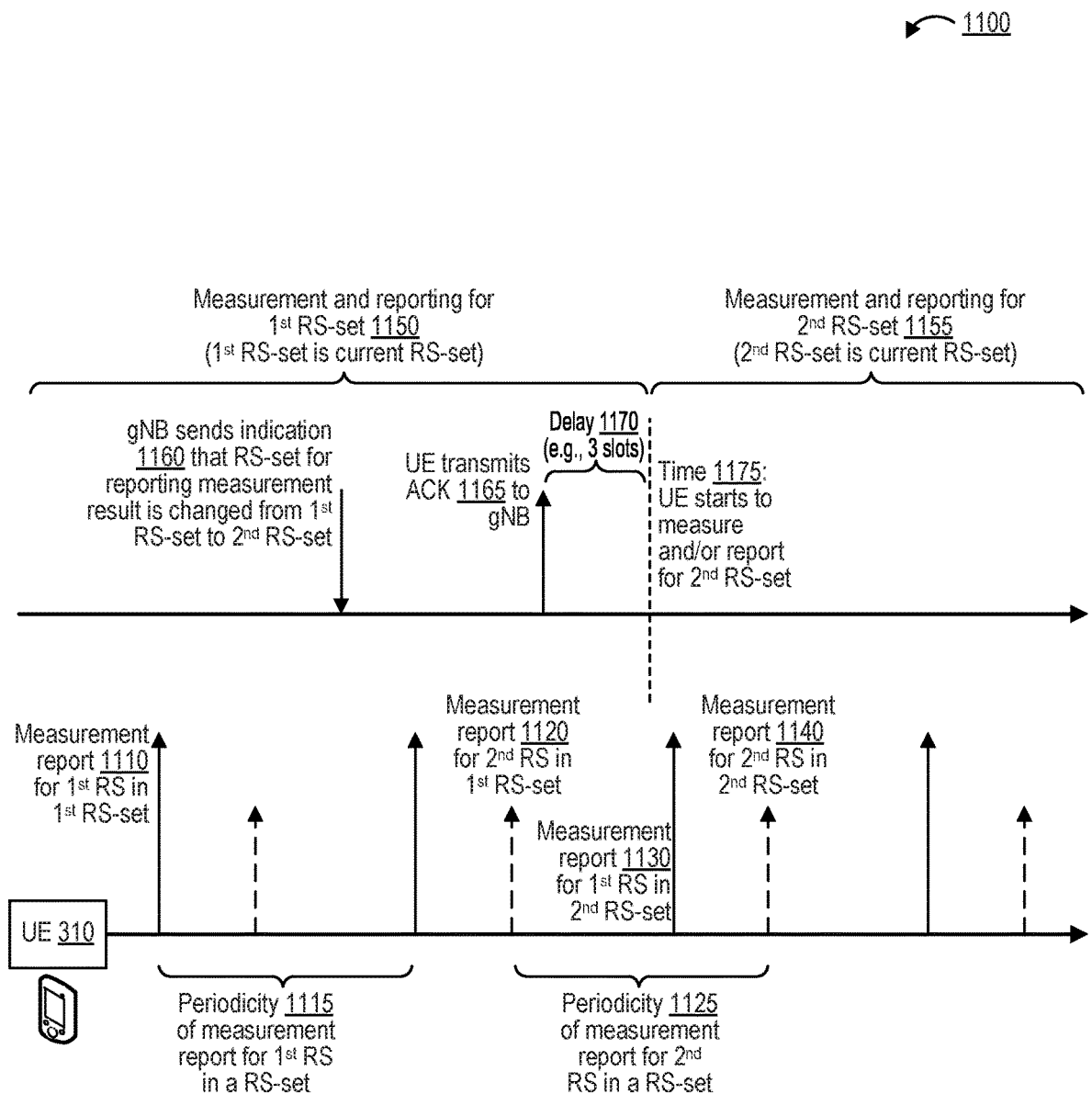
FIG. 11 illustrates measurement reporting and RS-set adaptation progress along a timeline.

FIG. 11 illustrates measurement reporting and RS-set adaptation progress along a timeline.

The timeline diagram 1100 of FIG. 11, like the timeline diagram 900 of FIG. 9, illustrates measurement reporting by the UE 310 along a horizontal timeline, with time moving forward as the timeline progresses from the left side of the diagram 1100 to the right side of the diagram 1100. Vertical arrows extending from the timeline and pointing upward (toward the top of the diagram 1100) represent transmissions from the UE 310 to the gNB 305, while vertical arrows pointing downward into the timeline (toward the bottom of the diagram 1100) represent transmissions from the gNB 305 to the UE 310.

Starting from the left side of the timeline diagram 1100, the longer solid vertical arrows represent measurement reports 1110 (e.g., CSI reports) for a first RS in a first RS-set, while the shorter dashed vertical arrows represent measurement reports 1120 (e.g., CSI reports) for a second RS in the first RS-set. The measurement reports 1110 for the first RS in the first RS-set repeat at a periodicity 1115 of measurement reports for the first RS in a RS-set. The measurement reports 1120 for the second RS in the first RS-set repeat at a periodicity 1125 of measurement reports for the second RS in a RS-set. In a power saving mode, the periodicity 1115 may be equal to the periodicity 1125.

Going from left to right in the timeline diagram 900, the gNB 305 sends to the UE 310 an indication 1160 that the current RS-set for reporting measurement result is to be changed from the first RS-set to the second RS-set. The indication 1160 may be sent from the gNB 305 to the UE 310, and received at the UE 310, via physical layer signal and/or MAC CE. The indication 1160 may be sent by the gNB 305 to the UE 310 in response to receipt of a request at the gNB 305 from the UE 310 to change the current RS-set from the first RS-set to the second RS-set, for example based on a determination by the UE 310 based on the UE 310's measurements that the second condition 825 and/or third condition 830 are satisfied (and/or that the fourth condition 835 is not satisfied). Alternately, the indication 1160 may be sent by the gNB 305 to the UE 310 in response to the gNB 305 identifying that the second condition 825 and/or third condition 830 have been satisfied (and/or that the fourth condition 835 is not satisfied), for example based on measurement reports transmitted from the UE 310 (and/or other UEs) to the gNB 305. Either way, the UE 310 receives this indication 1160 from the gNB 305.

In response to receiving the indication 1160 from the gNB 305, the UE 310 may transmit an acknowledgment (ACK) 1165 back to the gNB 305. Furthermore, in response to receiving the indication 1160 from the gNB 305, the UE 310 may stop the (e.g., CSI) measurement and report for the first RS-set and/or perform the (e.g., CSI) measurement and report for the second RS-set using the same or different uplink resource (e.g., PUCCH). Following receipt of the indication 1160 from the gNB 305 at the UE 310 and/or transmission of the ACK from the UE 310 to the gNB 305 and/or a delay 1170 (e.g., 3 slots following transmission of the ACK 1165), a time 1175 is reached (identified by a vertical dashed line) at which the UE 310 starts. The delay 1170 may be a processing delay, a switching delay, application delay, reconfiguration delay, or some combination thereof. In some cases, the delay 1170 may be a fixed amount of time, such as 1, 2, 3, 4, 5, or 6 slots. In some cases, the delay 1170 does not exist, and the time 1175 can occur in parallel with the UE 310 transmitting the ACK 1165 to the gNB 305 or even slightly before (e.g., 1, 2, 3, 4, 5, or 6 slots before) the UE 310 transmits the ACK 1165 to the gNB 305 but after the UE 310 receives the indication 1160 from the gNB 305.

Following the time 1175, the current RS-set is changed from the first RS-set to the second RS-set, which may have better channel quality than the first RS-set (e.g., by at least the second offset threshold A2) or may have a channel quality that is generally considered good (e.g., better than the third threshold A3). Thus, in the area 1150 to the left of the second dashed vertical line representing the time 1175, the vertical arrows represent measurement and measurement reporting for the first RS-set. In contrast, in the area 1155 to the right of the vertical line representing the time 1175, the vertical arrows represent measurement and measurement reporting for the second RS-set.

Within the area 1155 to the right of the vertical line representing the time 1175, the longer solid vertical arrows represent measurement reports 1130 (e.g., CSI reports) for the first RS in the second RS-set, while the shorter dashed vertical arrows represent measurement reports 1140 (e.g., CSI reports) for the second RS in the second RS-set. The measurement reports 1130 for the first RS in the second RS-set repeat at the periodicity 1115 of measurement reports for the first RS in a RS-set. The measurement reports 1140 for the second RS in the second RS-set repeat at the periodicity 1125 of measurement reports for the second RS in a RS-set.

Based on the indication 1160, the UE 310 may determine to change the RS and/or RS-set for reporting its measurement result(s) (e.g., CSI) via same set of uplink resources (e.g., PUCCH, PUSCH) and/or to change the Transmission Configuration Indication (TCI) state for PDCCH reception. In some cases, based on the indication 1160, the CSI request field in a UL grant DCI may request the CSI report for at least one RS in the second RS-set.

The UE 310 may transmit measurement result(s) (e.g., CSI) according to a request made by the gNB 305 to the UE 310 (e.g., the indication 1160). In some cases, the gNB 305 may transmit a UL grant DCI to the UE 310 and the DCI may comprise a CSI request field for aperiodic CSI report. The CSI request field may request a CSI report for a current RS-set or a candidate RS-set. If the CSI request is for a candidate RS-set, the UE may transmit an identity of RS-set, an identity of at least one RS (e.g., in the RS-set), and/or a measurement result (e.g., RSRP, RSRQ, SINR, CSI) of at least one RS in the RS-set.

Values in the CSI request field may control what the gNB 305 requests from the UE 310. In one illustrative example, the values in the CSI request field can be defined as follows:

| CSI request field | |
|---|---|
| 0 0 | No CSI Request |
| 0 1 | CSI request for 1st CSI-RS of current RS-set |
| 1 0 | CSI request for 2nd CSI-RS of current RS-set |
| 1 1 | CSI request for UE recommend RS |

Referring to the above table as an example, if the CSI request field includes the values "0 0," this may correspond to no CSI request, in which case the UE may not send any CSI. If the CSI request field includes the values "0 1," this may correspond to a CSI request for the first CSI-RS of the current RS-set. Based on the CSI request field value of "0 1," the UE can transmit (e.g., over a PUSCH resource or other uplink resource) a CSI for the first RS of the current RS-set. If the CSI request field includes the values "1 0," this may correspond to a CSI request for the second CSI-RS of the current RS-set. Based on the CSI request field value of "1 0," the UE can transmit (e.g., over a PUSCH resource or other uplink resource) a CSI for the second RS of the current RS-set. If the CSI request field includes the values "1 1," this may correspond to a CSI request for an RS of the current RS-set that is recommended or preferred by the UE. The RS that is recommended or preferred by the UE may be determined based on channel quality, the QCL assumption, the power saving consideration, the usage of panel, antenna subarray, another RS characteristic discussed herein, or some combination thereof.

The quality of an RS-set may be defined in a number of ways. The quality of the current RS-set may be defined as, or include, for example, the measurement result of a RS in the RS-set with a best quality, the measurement result of a RS in the RS-set with a worst quality, the averaged measurement result of one or more RS(s) in the RS-set, the measurement result of one, some, or all RS(s) in the RS-set, or some combination thereof. The quality of the candidate RS-set may be defined as, or include, for example, the measurement result of a RS in the RS-set with a best quality, the measurement result of a RS in the RS-set with a worst quality, the averaged measurement result of one or more RS(s) in the RS-set, the measurement result of one, some, or all RS(s) in the RS-set, or some combination thereof. Current RS-set and candidate RS-set(s) may be related to the same coverage (e.g., same QCL assumption) of a SSB beam (e.g., SSB index).

Figure 12:
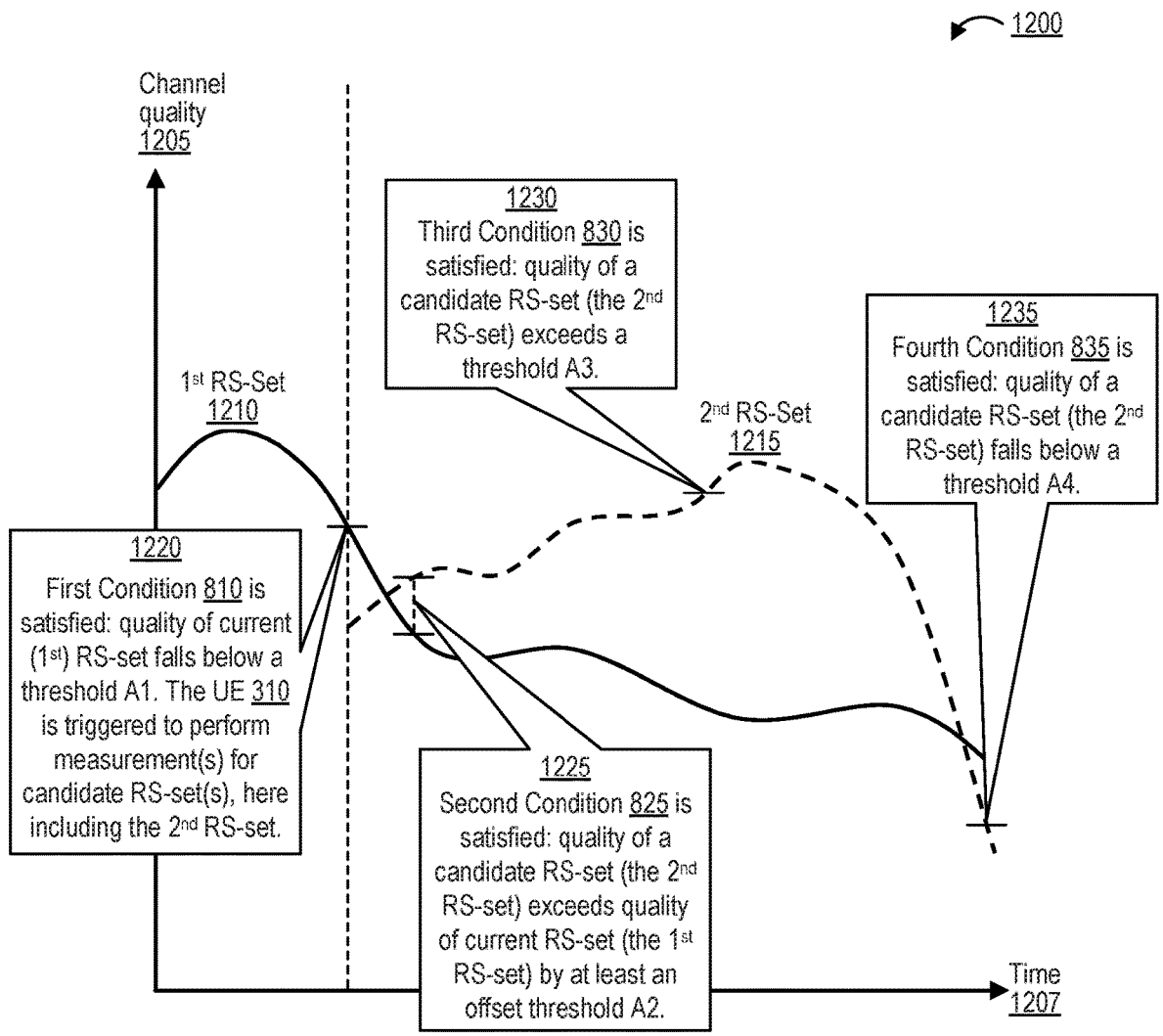
FIG. 12 is a graph illustrating channel quality of two RS-sets over a period of time that also shows when a set of conditions are met.

FIG. 12 is a graph illustrating channel quality of two RS-sets over a period of time that also shows when a set of conditions are met.

The graph 1200 of FIG. 12 includes a vertical axis that tracks channel quality (referred to as a vertical channel quality axis 1205), with higher channel quality being represented as closer to the top of the graph 1200 along the vertical channel quality axis 1205, and lower channel quality being represented as closer to the bottom of the graph 1200 along the vertical channel quality axis 1205. The graph 1200 of FIG. 12 includes a horizontal axis that tracks time (referred to as a horizontal time axis 1207), with time proceeding from the left side of the graph 1200 to the right side of the graph 1200 along the horizontal time axis 1207.

The graph 1200 tracks channel quality for two RS-sets: a first RS-set 1210 and a second RS-set 1215. Starting from time zero along the time axis 1207, only channel quality data for the first RS-set 1210 is present, and is indicated by a solid-lined curve. At a time 1220, the first condition 810 is satisfied, in that the channel quality of current RS-set (the first RS-set 1210) falls below a threshold A1, which is indicated by a short horizontal line along the channel quality data curve for the first RS-set 1210 at time 1220. The UE 310 is triggered to perform measurement(s) for one or more candidate RS-set(s) following the time 1220, which is also indicated by a vertical dashed line with short dashes. Thus, starting from the time 1220, channel quality data for a second RS-set 1215 is also present, and is indicated by a dashed-lined curve. The second RS-set 1215 is one of the one or more candidate RS-set(s).

At a time 1225, the second condition 825 is satisfied, in that a channel quality of a candidate RS-set—the second RS-set 1215—exceeds quality of current RS-set—the first RS-set 1210—by at least an offset threshold A2. The offset threshold is illustrated as the length of a dashed vertical line stretching between two horizontal lines at time 1225, the two horizontal lines being along the channel quality data curve for the first RS-set 1210 and the second RS-set 1215, respectively. At a time 1230, the third condition 830 is satisfied, in that the channel quality of a candidate RS-set—the second RS-set 1215—exceeds a threshold A3, which is indicated by a short horizontal line along the channel quality data curve for the second RS-set 1215 at time 1230. At a time 1235, the fourth condition 835 is satisfied, in that the channel quality of a candidate RS-set—the second RS-set 1215—falls below a threshold A4, which is indicated by a short horizontal line along the channel quality data curve for the second RS-set 1215 at time 1235.

Figure 13:
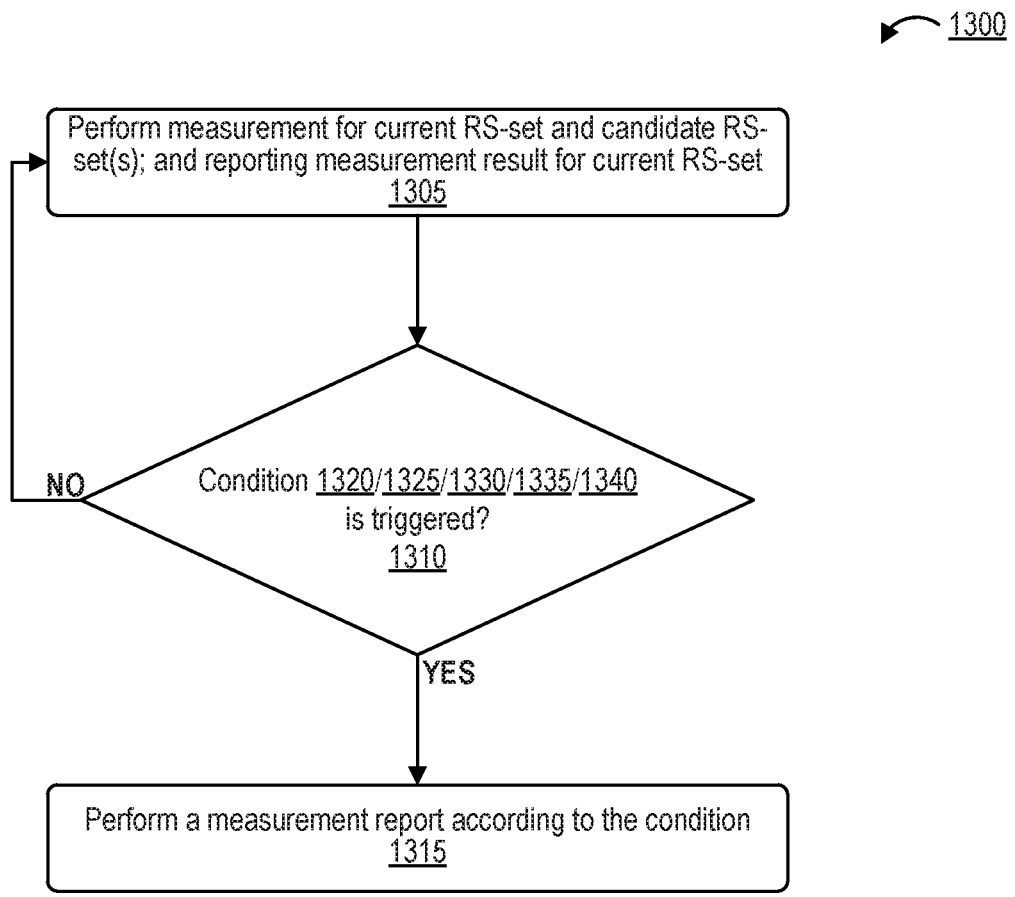
FIG. 13 is a flow diagram illustrating measurement and measurement reporting based on another set of multiple conditions.

FIG. 13 is a flow diagram illustrating measurement and measurement reporting based on another set of multiple conditions.

The flow diagram of FIG. 13 represents a process 1300 providing a second option for condition-based measurement and measurement reporting as an alternative to the first option represented by the flow diagram 800 of FIG. 8. At block 1305, UE 310 performs one or more measurement(s) for one or more RS(s) for the current RS-set and also performs one or more measurement(s) for one or more RS(s) for one or more candidate RS-set(s). The UE 310 may perform the measurement(s) for the current RS-set and for the one or more candidate RS-set(s) with the same periodicity, or with different periodicity. In some cases, only a subset of the possible candidate RS-set(s) may be measured, which may be based on the priority of RS-set(s) as discussed with respect to the cell 1000 of FIG. 10. Similarly, order of measurement of the candidate RS-set(s) may be determined by priority, as described above.

Block 1305 also includes the UE 310 generating one or more measurement report(s) identifying the measurement(s) for the current RS-set, and sends one or more of the measurement report(s) to the gNB 305. The gNB 305 receives the measurement report(s). In some cases, the UE 310 also generates one or more measurement report(s) identifying the measurement(s) for the one or more of the candidate RS-set(s). In some cases, the gNB 305 may not generate measurement report(s) for the one or more of the candidate RS-set(s) when the UE is in power saving mode. Block 1305 is followed by block 1310.

At block 1310, the UE 310 and/or the gNB 305 checks whether a first condition 1320, a second condition 1325, a third condition 1330, a fourth condition 1335, and/or a fifth condition 1340 are triggered/satisfied. If any of the first condition 1320, the second condition 1325, the third condition 1330, the fourth condition 1335, and/or the fifth condition 1340 are triggered/satisfied, then block 1310 is followed by block 1315. Otherwise, block 1310 is followed by block 1305. At block 1315, the UE 310 performs a measurement report according to the condition(s) that were found to be triggered/satisfied at block 1310. Block 1315 may include the UE 310 performing the measurement report based on a candidate RS-set being selected to replace the current RS-set. In the context of the process 1300, triggering conditions may be used to initiate measurement reporting (e.g., for the one or more of the candidate RS-set(s)) or to trigger RS-set update/re-selection to one or more of the candidate RS-set(s).

The first condition 1320 is that a channel quality of the current RS-set becomes worse than a predetermined threshold B1. For example, the UE 310 can determine that the channel quality of the current RS-set is less than the first threshold B1, or reaches the first threshold B1 after decreasing. The second condition 1325 is that a channel quality of at least one candidate RS-set become better than the channel quality for the current RS-set by at least a predetermined offset threshold B2. The third condition 1330 is that a channel quality of at least one candidate RS-set become better than a predetermined threshold B3. For example, the UE 310 can determine that the channel quality of the current RS-set exceeds the third threshold B3, or reaches the third threshold B3 after increasing. The fourth condition 1335 is that a channel quality of the current RS-set becomes worse than a predetermined threshold B4-1 and a channel quality of at least one candidate RS-set becomes better than a predetermined threshold B4-2. The threshold B4-1 may be higher than the threshold B4-2, lower than the threshold B4-2, or equal to the threshold B4-2. The fifth condition 1340 is that a channel quality of the current RS-set becomes worse than a predetermined threshold B5-1 and a channel quality of at least one candidate RS-set becomes worse than predetermined threshold B5-2. The threshold B5-1 may be higher than the threshold B5-2, lower than the threshold B5-2, or equal to the threshold B5-2.

As with the thresholds A1, A2, A3, and A4 discussed with respect to the process 800 of FIG. 8, the thresholds B1, B2, B3, B4-1, B4-2, B5-1, and B5-2 may be values of RSRP, RSRQ, SINR, CSI, or some combination thereof. As with the current and/or candidate RS-set measurements discussed with respect to the conditions 810, 825, 830, and 835 discussed with respect to the process 800 of FIG. 8, the current and/or candidate RS-set measurements discussed with respect to the conditions 1320, 1325, 1330, 1335, and 1340 may be based on measurements of one or more RSs in the RS-set, such as the lowest RS measurement value for the RS-set, the highest RS measurement value for the RS-set, an average value of one or more RS measurement values for the RS-set, or some combination thereof.

In some cases, any of the conditions 1320, 1325, 1330, 1335, or 1340 may be configured so that the condition must be satisfied for at least a particular threshold amount of time and/or for at least a particular threshold number of RS-set measurements, in order to be considered satisfied. Such configurations may be configured by RRC, MAC CE and/or DCI. The threshold amount of time may be different for each threshold, or certain threshold amounts of time may be equal to others. The threshold amount of time for each threshold may be denoted as $W_{B1}$ for the threshold B1, $W_{B2}$ for the threshold B2, $W_{B3}$ for the threshold B3, $W_{B4-1}$ for the threshold B4-1, $W_{B4-2}$ for the threshold B4-2, $W_{B5-1}$ for the threshold B5-1, and $W_{B5-2}$ for the threshold B5-2. The threshold number of measurements may be different for each threshold, or certain threshold numbers of measurements may be equal to others. The threshold number of measurements for each threshold may be denoted as $N_{B1}$ for the threshold B1, $N_{B2}$ for the threshold B2, $N_{B3}$ for the threshold B3, $N_{B4-1}$ for the threshold B4-1, $N_{B4-2}$ for the threshold B4-2, $N_{B5-1}$ for the threshold B5-1, and $N_{B5-2}$ for the threshold B5-2.

Figure 14:
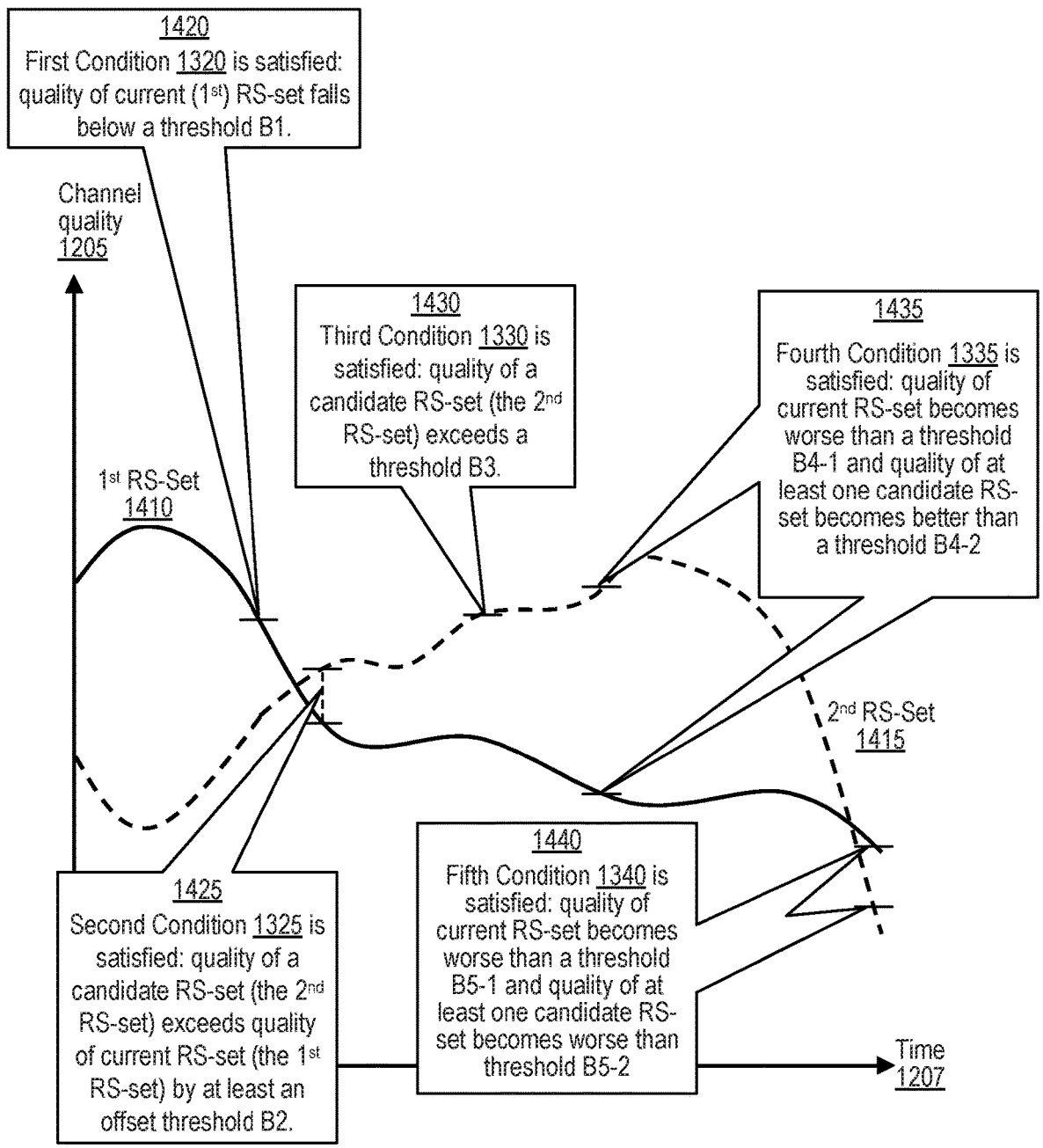
FIG. 14 is a graph illustrating channel quality of two RS-sets over a period of time that also shows when another set of conditions are met.

FIG. 14 is a graph illustrating channel quality of two RS-sets over a period of time that also shows when another set of conditions are met.

Like the graph 1200 of FIG. 12, the graph 1400 of FIG. 14 includes the vertical axis that tracks channel quality 1205, which increases from bottom to top, and the a horizontal axis that tracks time 1207, which increases from left to right. The graph 1400 tracks channel quality for two RS-sets: a first RS-set 1410 and a second RS-set 1415. In the graph 1400, both the first RS-set 1410 and the second RS-set 1415 start from time zero along the time axis 1207. The first RS-set 1410 is represented by a solid-lined curve, while the second RS-set 1415 is represented by a dashed-lined curve.

At a time 1420, the first condition 1320 is satisfied, in that the channel quality of current RS-set (the first RS-set 1410) falls below a threshold B1, which is indicated by a short horizontal line along the channel quality data curve for the first RS-set 1410 at time 1420. At a time 1425, the second condition 1325 is satisfied, in that a channel quality of a candidate RS-set—the second RS-set 1415—exceeds quality of current RS-set—the first RS-set 1410—by at least an offset threshold B2. The offset threshold is illustrated as the length of a dashed vertical line stretching between two horizontal lines at time 1425, the two horizontal lines being along the channel quality data curve for the first RS-set 1410 and the second RS-set 1415, respectively. At a time 1430, the third condition 1330 is satisfied, in that the channel quality of a candidate RS-set—the second RS-set 1415—exceeds a threshold B3, which is indicated by a short horizontal line along the channel quality data curve for the second RS-set 1415 at time 1430.

At a time 1435, the fourth condition 1335 is satisfied, in that the channel quality current RS-set—the first RS-set 1410—becomes worse than a threshold B4-1, and channel quality of at least one candidate RS-set—the second RS-set 1415—becomes better than a threshold B4-2. The threshold B4-1 is indicated by a short horizontal line along the channel quality data curve for the first RS-set 1410 at time 1435, while the threshold B4-2 is indicated by a short horizontal line along the channel quality data curve for the second RS-set 1415 at time 1435. At a time 1440, the fifth condition 1340 is satisfied, in that the channel quality current RS-set— the first RS-set 1410—becomes worse than a threshold B5-1, and channel quality of at least one candidate RS-set— the second RS-set 1415—becomes worse than a threshold B5-2. The threshold B5-1 is indicated by a short horizontal line along the channel quality data curve for the first RS-set 1410 at time 1435, while the threshold B5-2 is indicated by a short horizontal line along the channel quality data curve for the second RS-set 1415 at time 1435.

The timeline diagram 900 of FIG. 9 may also apply to the process 1300 of FIG. 13, though the first condition 810 may be omitted, and the "Second condition 825 is satisfied" line may be replaced by a line representing satisfaction of one or more of the first condition 1320, the second condition 1325, the third condition 1330, the fourth condition 1335, the fifth condition 1340, or some combination thereof. Similarly, the timeline diagram 1100 of FIG. 11 may also apply to the process 1300 of FIG. 13, with no change. According to the indication 1160, the CSI request field in a UL grant DCI may request the CSI report for at least one RS in the current RS-set and/or in an candidate RS-set (e.g., the second RS-set).

A UE may utilize or be configured with a pre-determined receiver (RX) beam or panel to perform measurement for other (candidate) RS-sets. In the power saving mode, the RX beam of the UE 310 may be fixed when performing measurement, so that only one single antenna subarray or panel (or set thereof) are operated. Even when an antenna subarray or panel (or set thereof) is switched, one antenna subarray or panel (or set thereof) may be turned off while (or within a threshold time of) the other antenna subarray or panel (or set thereof) is turned on, so that the UE only has one antenna subarray or panel (or set thereof) on at any given time. In some cases, more than one antenna subarray or panel (or set thereof) may be temporarily active, as there may be some temporary overlap in which antenna subarrays or panels (or sets thereof) are active while the UE 310 is switching from one antenna subarray or panel (or set thereof) to another. In some cases, no antenna subarray or panel (or set thereof) may be temporarily active, as there may be a temporary gap between the UE 310 is switching from one antenna subarray or panel (or set thereof) to another. Whether or not the UE 310's RX beam or panel is changed/switched may depend on triggering conditions. For example, for the first condition 810, the UE 310's RX beam may be changed or a panel may be turned on when the channel quality of the preferred RS-set associated with a pre-determined UE RX beam (i.e., same UE RX beam) is worse than a threshold A1. In another example, for the fifth condition 1340, the UE RX beam may be changed or panel may be turned on when the channel quality to all RS-sets associated with a pre-determined UE RX beam (i.e., same UE RX beam) is worse than one or more corresponding thresholds 5-1 and/or 5-2.

The configuration of RS-set and the RS-set adaptation is not limited to be applied to the power saving scheme. For example, this concept may be applied to reduce to measurement complexity for a system with large number of antenna. The RS in a RS-set may (or may not) have same QCL assumption.

Each RS in a RS-set may, but need not, be transmitted by the same serving cell (e.g, same gNB 305). The current RS-set may, but need not, be transmitted by the same serving cell (e.g, same gNB 305) as each of the candidate RS-sets. Any transmission from the gNB 305 to the UE 310, or from the UE 310 to the gNB 305, may further include a Cell ID to identify the cell/gNB 305. It should be understood that the terms "gNB" or "cell" as used herein may instead refer to an eNB, a node B (NB), a node, a serving cell, a TRP (e.g., transmission reception point), an unlicensed cell, an unlicensed serving cell, an unlicensed TRP, or another type of base station (BS) or cell or node. It should be understood that the term "gNB" may be used to refer to multiple base stations, since different RS-sets may be served by different base stations or cells or nodes.

Satisfaction of the various conditions discussed herein may trigger a variety of actions. For example, upon triggering any condition discussed herein, such as the fourth condition 835 or the fifth condition 1340, the UE 310 may be triggered to initiate a random access procedure, report a radio problem indication, perform a handover procedure, or some combination thereof.

The power saving configuration or the activation indication may be associated with a timer counting to a particular time threshold anywhere from 1 to 10000 milliseconds (ms) or a value in between, which the measurement and/reporting behavior may be operated based on. For example, upon timer expiry, the UE may leave the power saving mode and stop timer (e.g., the UE falls back to the normal measurement operation). If UE power saving remains needed, the UE may request to enter the power saving mode again, before or after the timer expiry; the UE may receive an activation indication and restart the timer.

FIG. 15A is a flow diagram illustrating a first set of operations for handling measurement set adaptation.

The process 1500 of FIG. 15A is performed by a UE 310. At block 1505, the UE 310 receives a measurement configuration that includes a triggering condition (e.g., any of conditions 810, 825, 830, 835, 1320, 1325, 1330, 1335, 1340, or some combination thereof). At block 1510, the UE 310 receives a first reference signal (RS) from a first reference signal set (RS-set) of one or more RSs. In some cases, the one or more RSs of the RS-set are quasi-colocated (QCLd). At block 1515, the UE 310 measures a measurement result based on the first RS. The measurement result is indicative of a first channel quality associated with the first RS-set.

At block 1520, the UE 310 identifies, based on the measurement result, whether the triggering condition is satisfied. If the UE 310 identifies that the triggering condition is satisfied at block 1520, then block 1525 follows block 1520. Otherwise, block 1510 follows block 1520. At block 1525, the UE 310 (in some cases, together with a base station such as the gNB 305) switches from the first RS-set to a second RS-set in response to identifying that the triggering condition is satisfied.

Figure 15B:
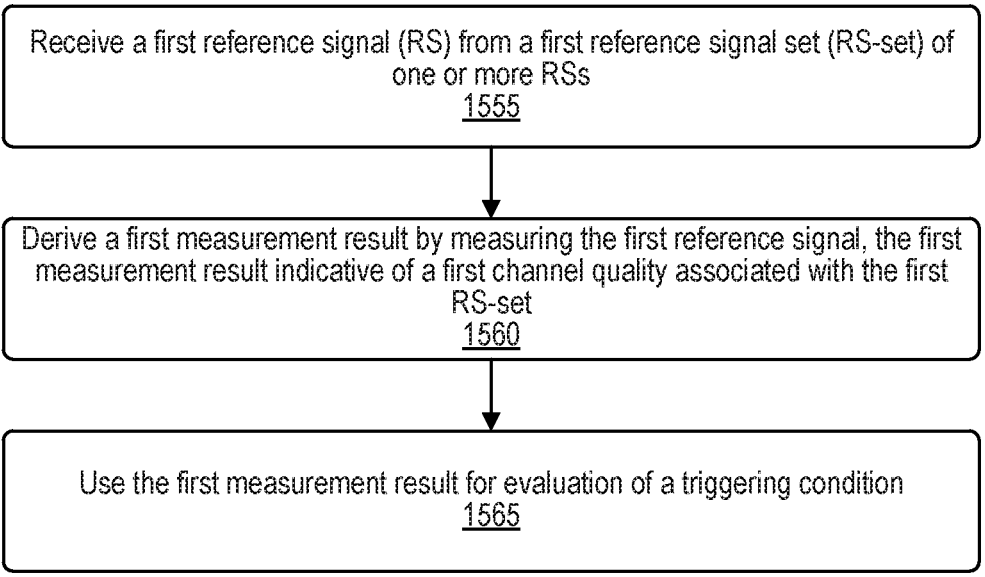
FIG. 15B is a flow diagram illustrating a second set of operations for handling measurement set adaptation.

FIG. 15B is a flow diagram illustrating a second set of operations for handling measurement set adaptation.

The process 1550 of FIG. 15B is performed by a UE 310. At block 1555, the UE 310 receives a first reference signal (RS) from a first reference signal set (RS-set) of one or more RSs. Block 1555 of the process 1550 may correspond to block 1510 of the process 1500. At block 1560, the UE 310 derives a first measurement result by measuring the first reference signal, the first measurement result indicative of a first channel quality associated with the first RS-set. Block 1560 of the process 1550 may correspond to block 1515 of the process 1500. At block 1565, the UE 310 uses the first measurement for evaluation of a triggering condition. Block 1565 of the process 1550 may correspond to block 1520 of the process 1500.

In some cases, the process 1550 also includes receiving a measurement configuration that includes the triggering condition (as in block 1505 of the process 1500) before receiving the first RS at block 1555. In some cases, the process 1550 also includes activating a power saving mode after receiving the measurement configuration. In some cases, the one or more RS-sets include a plurality of RS-sets and the measurement configuration includes a prioritization order of the plurality of RS-set. The prioritization order prioritizes the plurality of RS-sets for at least one of performing measurement, switching RS-sets, and/or transmitting the measurement report. In some cases, the one or more RS-sets include at least a second RS-set and a third RS-set, and wherein the measurement configuration includes a prioritization order that orders the one or more RS-sets such that the third RS-set has a lower priority than the second RS-set. In such cases, switching from the first RS-set to the second RS-set may occur based on the prioritization order of the one or more RS-sets.

In some cases, the process 1550 also includes identifying, based on the first measurement result, that the triggering condition is satisfied (as in block 1520 of process 1500), and switching from the first RS-set to a second RS-set in response to identifying that the triggering condition is satisfied (as in block 1525 of process 1500). In some cases, switching from the first RS-set to the second RS-set includes transmitting an uplink (UL) signal to a base station, in some cases causing the base station to switch from the first RS-set to the second RS-set. In some cases, identifying that the triggering condition is satisfied includes identifying, based on the first measurement result, that the first channel quality has fallen below a threshold channel quality value.

In some cases, the process 1550 also includes receiving a second RS from the second RS-set and deriving a second measurement result by measuring the second RS after identifying that the triggering condition is satisfied, the second measurement result indicative of a second channel quality associated with the second RS-set. In such cases, the process 1550 may also include identifying, based on the second measurement result, that a second triggering condition is satisfied, wherein the measurement configuration also includes the second triggering condition that is distinct from the triggering condition, wherein switching from the first RS-set to the second RS-set occurs in response to identifying that the second triggering condition is satisfied after the triggering condition is satisfied.

In some cases, the process 1550 also includes receiving a second RS from the first RS-set, deriving a second measurement result by measuring the second RS, and identifying the first channel quality associated with the first RS-set based on a function of at least the first measurement result and the second measurement result, wherein identifying that the triggering condition is satisfied is based on the first channel quality. In some cases, the function of at least the first measurement result and the second measurement result is an average of at least the first measurement result and the second measurement result. In some cases, the function of at least the first measurement result and the second measurement result is a maximum of at least the first measurement result and the second measurement result. In some cases, the function of at least the first measurement result and the second measurement result is a minimum of at least the first measurement result and the second measurement result.

In some cases, the process 1550 also includes receiving a second RS from the second RS-set and deriving a second measurement result by measuring the second RS. The second measurement result is indicative of a second channel quality associated with the second RS-set, and identifying that the triggering condition is satisfied is in some cases based on the first measurement result and the second measurement result. In some cases, identifying that the triggering condition is satisfied includes identifying, based on the first measurement result and the second measurement result, that the second channel quality exceeds the first channel quality by at least a threshold offset value. In some cases, identifying that the triggering condition is satisfied includes identifying, based on the second measurement result, that the second channel quality exceeds a threshold channel quality value.

In some cases, the process 1550 also includes generating a measurement report identifying at least the first measurement result and transmitting the measurement report along an uplink (UL) channel. In some cases, the process 1550 also includes deriving a second measurement result by measuring the first RS, wherein the measurement report includes at least the first measurement result and the second measurement result. In some cases, the process 1550 also includes transmitting the measurement report along the uplink (UL) channel in response to using the first measurement result for evaluation of the triggering condition, for instance in response to identifying that the triggering condition is satisfied.

In some cases, the one or more RSs of the first RS-set are quasi-colocated (QCLd). In some cases, the process 1550 also includes switching from the first RS-set to a second RS-set (as in block 1525) in response to using the first measurement result for evaluation of a triggering condition and based on the second RS-set being QCLd with the first RS-set. In some cases, process 1550 also includes receiving a signal that is quasi-colocated (QCLd) with at least one RS of the first RS-set, wherein the signal includes at least one of a control signal, a data signal, and/or a reference signal.

In some cases, the first measurement result includes at least one of a reference signal received power (RSRP), a reference signal received quality (RSRQ), a signal to interference and noise ratio (SINR), and/or channel state information (CSI).

In some cases, either of the processes 1500 or 1550 may be performed by a system or apparatus such as a UE 310 or other computing system 1600, which may include, for instance, one or more receivers, one or more transmitters, one or more transceivers, a memory storing instructions, a processor executing the instructions to perform either of the processes 1500 or 1550, or some combination thereof. In some cases, a non-transitory computer readable storage medium having embodied thereon a program may be provided, wherein the program is executable by a processor to perform either of the processes 1500 or 1550.

Figure 16:
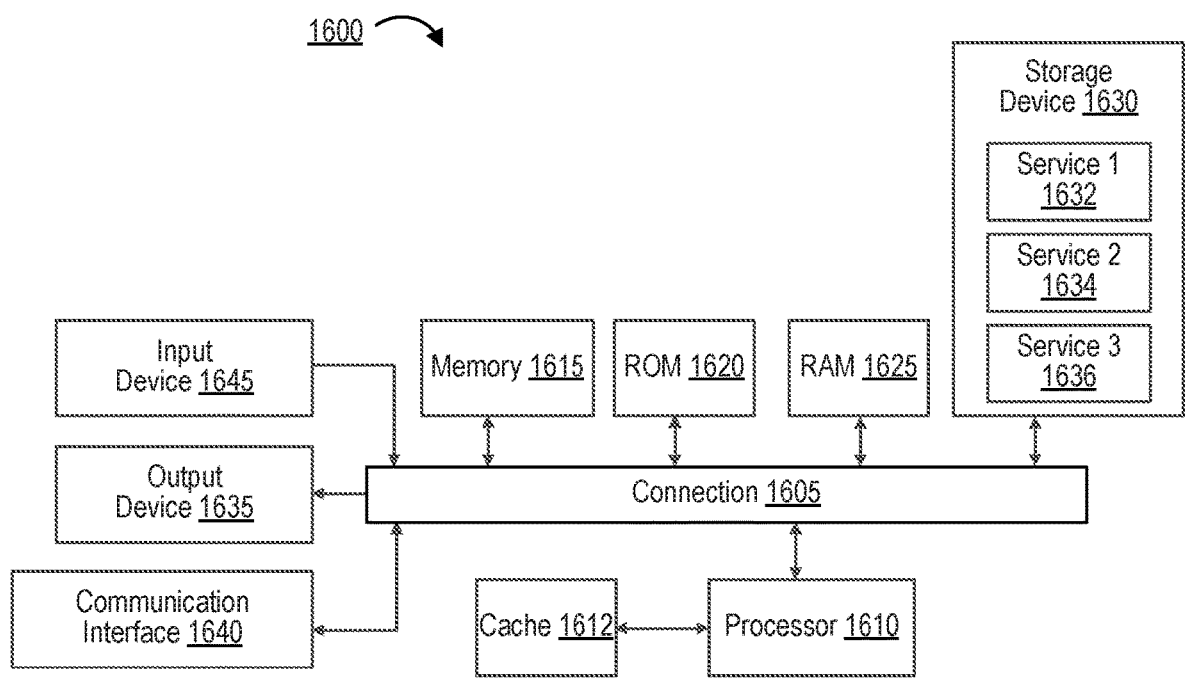
FIG. 16 is a diagram illustrating an example of a system for implementing certain aspects of the present technology.

FIG. 16 is a diagram illustrating an example of a system for implementing certain aspects of the present technology. In particular, FIG. 16 illustrates an example of computing system 1600, which can be for example any computing device making up internal computing system, a remote computing system, a camera, or any component thereof in which the components of the system are in communication with each other using connection 1605. Connection 1605 can be a physical connection using a bus, or a direct connection into processor 1610, such as in a chipset architecture. Connection 1605 can also be a virtual connection, networked connection, or logical connection.

In some embodiments, computing system 1600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1600 includes at least one processing unit (CPU or processor) 1610 and connection 1605 that couples various system components including system memory 1615, such as read-only memory (ROM) 1620 and random access memory (RAM) 1625 to processor 1610. Computing system 1600 can include a cache 1612 of high-speed memory connected directly with, in close proximity to, or integrated as part of processor 1610.

Processor 1610 can include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms known to those of skill in the art. In some instances, multimodal systems can enable a user to provide multiple types of input/output to communicate with computing system 1600. Computing system 1600 can include communications interface 1640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 1630 can include software services, servers, services, etc., that when the code that defines such software is executed by the processor 1610, it causes the system to perform a function. In some embodiments, a hardware service that performs a particular function can include the software component stored in a computer-readable medium in connection with the necessary hardware components, such as processor 1610, connection 1605, output device 1635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method for entering a power saving mode by a user equipment (UE), the method comprising:
    sending a power saving request, wherein the power saving request includes a list of one or more preferred reference signals, and wherein when the power saving request is received by a base station, the base station generates a power saving configuration;
    receiving the power saving configuration, wherein the power saving configuration specifies one or more reference signal sets (RS-sets) associated with a serving cell, and wherein the one or more RS-sets are selected based on the one or more preferred reference signals;
    receiving one or more reference signals (RSs), wherein the one or more RSs are associated with the one or more RS-sets;
    deriving one or more measurement results by measuring the one or more RSs;
    using the one or more measurement results and the power saving configuration to perform an evaluation of a triggering condition, wherein the triggering condition is defined in the power saving configuration;
    performing one or more operations when the triggering condition is satisfied, wherein the one or more operations are performed according to the power saving configuration, wherein the one or more operations include sending the one or more measurement results, and wherein when the one or more measurement results are received by the base station, the base station provides an activation indication; and
    entering the power saving mode, wherein the power saving mode is entered into in response to the activation indication.

2. The method of claim 1, wherein the one or more RS-sets include a plurality of RS-sets, wherein the power saving configuration further includes a prioritization order of the plurality of RS-sets, and wherein the prioritization order prioritizes the plurality of RS-sets for at least one of performing a measurement, switching RS-sets, and transmitting a measurement report that includes the one or more measurement results.

3. The method of claim 1, wherein the one or more RS-sets include at least a first RS-set and a second RS-set, wherein the power saving configuration further includes a prioritization order that orders the one or more RS-sets such that the second RS-set has a lower priority than the first RS-set, and wherein switching from the second RS-set to the first RS-set occurs based on the prioritization order of the one or more RS-sets.

4. The method of claim 1, wherein the one or more operations further include:
    switching from a first RS-set to a second RS-set in response to identifying that the triggering condition is satisfied.

5. The method of claim 1, further comprising:
    determining, based on the one or more measurement results, that a second triggering condition is satisfied, wherein the power saving configuration further includes the second triggering condition that is distinct from the triggering condition; and
    switching from a first RS-set to a second RS-set in response to determining that the second triggering condition is satisfied after the triggering condition is satisfied.

6. The method of claim 1, further comprising:
    receiving a new RS from a first RS-set associated with the one or more RS-sets;
    deriving a new measurement result by measuring the new RS; and
    identifying a channel quality associated with the first RS-set based on a function of at least a measurement result associated with the first RS-set and corresponding to the one or more measurement results and the new measurement result, wherein the triggering condition is satisfied based on the channel quality.

7. The method of claim 1, further comprising:
    receiving a new RS from an RS-set associated with the one or more RS-sets; and
    deriving a new measurement result by measuring the new RS, wherein the new measurement result is indicative of a channel quality associated with the RS-set, and wherein the triggering condition is satisfied based on the one or more measurement results and the new measurement result.

8. The method of claim 1, wherein the one or more operations further include:
    transmitting an uplink (UL) signal, wherein when the UL signal is received at a base station, the base station switches from a first RS-set to a second RS-set.

9. The method of claim 1, wherein the triggering condition is satisfied as a result of the one or more measurement results indicating that a channel quality associated with the one or more RS-sets has fallen below a threshold channel quality value.

10. The method of claim 1, wherein the one or more operations further include:
  generating a measurement report identifying the one or more measurement results; and
  transmitting the measurement report along an uplink (UL) channel.

11. The method of claim 1, wherein the one or more operations further include:
  deriving a new measurement result by measuring the one or more RSs; and
  generating a measurement report, wherein the measurement report includes at least one of the one or more measurement results and the new measurement result.

12. The method of claim 1, wherein the one or more operations further include:
  transmitting the one or more measurement results along an uplink (UL) channel in response to using the one or more measurement results and the power saving configuration to perform the evaluation of the triggering condition.

13. The method of claim 1, wherein the one or more RSs are quasi-colocated (QCLd).

14. The method of claim 1, wherein the one or more operations further include:
  determining that a first RS-set and a second RS-set are quasi-colocated (QCLd); and
  switching from the first RS-set to the second RS-set based on the second RS-set being QCLd with the first RS-set.

15. The method of claim 1, further comprising:
  receiving a signal that is quasi-colocated (QCLd) with at least one RS of the one or more RS-sets, wherein the signal includes at least one of a control signal, a data signal, and a reference signal.

16. The method of claim 1, wherein the one or more measurement results include at least one of a reference signal received power (RSRP), a reference signal received quality (RSRQ), a signal to interference and noise ratio (SINR), and channel state information (CSI).

17. The method of claim 1, wherein the one or more operations further include:
  selecting a preferred RS-set from the one or more RS-sets, wherein the preferred RS-set is selected based on the one or more RS measurements and the power saving configuration; and
  generating measurement reporting information, wherein the measurement reporting information identifies the preferred RS-set, and wherein when the measurement reporting information is received by a base station, the base station uses at least one beam in the preferred RS-set for communications with the UE while the UE is in the power saving mode.

18. The method of claim 1, wherein:
  the power saving configuration is associated with a timer; and
  the method further comprises leaving the power saving mode upon expiry of the timer.

19. An apparatus entering a power saving mode, the apparatus comprising:
  one or more transmitters;
  one or more receivers;
  a memory storing instructions; and
  a processor executing the instructions, wherein execution of the instructions by the processor causes the processor to:
    send, through the one or more transmitters, a power saving request, wherein the power saving request includes a list of one or more preferred reference signals, and wherein when the power saving request is received by a base station, the base station generates a power saving configuration;
    receive, through the one or more receivers, the power saving configuration, wherein the power saving configuration specifies one or more reference signal sets (RS-sets) associated with a serving cell, and wherein the one or more RS-sets are selected based on the one or more preferred reference signals;
    receive, through the one or more receivers, one or more reference signals (RSs), wherein the one or more RSs are associated with the one or more RS-sets;
    derive one or more measurement results by measuring the one or more RSs;
    use the one or more measurement results and the power saving configuration to perform an evaluation of a triggering condition, wherein the triggering condition is defined in the power saving configuration;
    perform one or more operations when the triggering condition is satisfied, wherein the one or more operations are performed according to the power saving configuration, wherein the one or more operations include using the one or more receivers to send the one or more measurement results, and wherein when the one or more measurement results are received by the base station, the base station provides an activation indication; and
    enter the power saving mode, wherein the power saving mode is entered into in response to the activation indication.

20. The apparatus of claim 19, wherein the one or more RS-sets include a plurality of RS-sets, wherein the power saving configuration further includes a prioritization order of the plurality of RS-sets, and wherein the prioritization order prioritizes the plurality of RS-sets for at least one of performing a measurement, switching RS-sets, and transmitting a measurement report that includes the one or more measurement results.

21. The apparatus of claim 19, wherein the one or more RS-sets include at least a first RS-set and a second RS-set, wherein the power saving configuration further includes a prioritization order that orders the one or more RS-sets such that the second RS-set has a lower priority than the first RS-set, and wherein switching from the second RS-set to the first RS-set occurs based on the prioritization order of the one or more RS-sets.

22. The apparatus of claim 19, wherein the one or more operations further include:
  switching from a first RS-set to a second RS-set in response to identifying that the triggering condition is satisfied.

23. The apparatus of claim 19, wherein execution of the instructions further causes the processor to:
  determine, based on the one or more measurement results, that a second triggering condition is satisfied, wherein the power saving configuration further includes the second triggering condition, and wherein the second triggering condition is distinct from the triggering condition; and
  switch from a first RS-set to a second RS-set in response to determining that the second triggering condition is satisfied after the triggering condition is satisfied.

24. The apparatus of claim 19, wherein execution of the instructions further cause the processor to:
  receive, through the one or more receivers, a new RS from a first RS set associated with the one or more RS sets;

derive a new measurement result by measuring the new RS, and identify a channel quality associated with the first RS-set based on a function of at least a measurement result associated with the first RS-set and corresponding to the one or more measurement results and the new measurement result, wherein the triggering condition is satisfied based on the channel quality.

25. The apparatus of claim 19, wherein execution of the instructions further causes the processor to:

receive, through the one or more receivers, a new RS from an RS set associated with the one or more RS sets; and derive a new measurement result by measuring the new RS, wherein the new measurement result is indicative of a channel quality associated with the RS-set, and wherein the triggering condition is satisfied based on the one or more measurement results and the new measurement result.

26. The apparatus of claim 19, wherein the one or more operations further include:

using the one or more transmitters to transmit an uplink (UL) signal, and wherein when the UL signal is received at a base station, the base station switches from a first RS-set to a second RS-set.

27. The apparatus of claim 19, wherein the triggering condition is satisfied as a result of the one or more measurement results indicating that a channel quality associated with the one or more RS-sets has fallen below a threshold channel quality value.

28. The apparatus of claim 19, wherein the one or more operations further include:

generating a measurement report identifying the one or more measurements results; and using the one or more transmitters to transmit the measurement report along an uplink (UL) channel.

29. The apparatus of claim 19, wherein the one or more operations further include:

deriving a new measurement result by measuring the one or more RSs; and generating a measurement report, wherein the measurement report includes at least the one or more measurement results and the new measurement result.

30. The apparatus of claim 19, wherein the one or more operations further include:

using the one or more transmitters to transmit the one or more measurement results along an uplink (UL) channel in response to using the one or more measurement results and the power saving configuration to perform the evaluation of the triggering condition.

31. The apparatus of claim 19, wherein the one or more RSs are quasi-colocated (QCLd).

32. The apparatus of claim 19, wherein the one or more operations further include:

determining that a first RS-set and a second RS-set are quasi-colocated (QCLd); and switching from the first RS-set to the second RS-set based on the second RS-set being QCLd with the first RS-set.

33. The apparatus of claim 19, wherein execution of the instructions further causes the processor to:

receive, through the one or more receivers, a signal that is quasi-colocated (QCLd) with at least one RS of the one or more RS-sets, wherein the signal includes at least one of a control signal, a data signal, and a reference signal.

34. The apparatus of claim 19, wherein the one or more measurement results include at least one of a reference signal received power (RSRP), a reference signal received quality (RSRQ), a signal to interference and noise ratio (SINR), and channel state information (CSI).

35. The apparatus of claim 19, wherein the one or more operations further include:

selecting a preferred RS-set from the one or more RS-sets, wherein the preferred RS-set is selected based on the one or more RS measurements and the power saving configuration; and generating measurement reporting information, wherein the measurement reporting information identifies the preferred RS-set, and wherein when the measurement reporting information is received by a base station, the base station uses at least one beam in the preferred RS-set for communications with the apparatus while the apparatus is in the power saving mode.

36. The apparatus of claim 19, wherein:

the power saving configuration is associated with a timer; and execution of the instructions further causes the processor to leave the power saving mode upon expiry of the timer.

37. A non-transitory computer readable storage medium having embodied thereon a program, wherein the program is executable by a processor to perform a method of entering a power saving mode, the method comprising:

sending a power saving request, wherein the power saving request includes a list of one or more preferred reference signals, and wherein when the power saving request is received by a base station, the base station generates a power saving configuration;

receiving the power saving configuration, wherein the power saving configuration specifies one or more reference signal sets (RS-sets) associated with a serving cell, and wherein the one or more RS-sets are selected based on the one or more preferred reference signals;

receiving one or more reference signals (RSs), wherein the one or more RSs are associated with the one or more RS-sets;

deriving one or more measurement results by measuring the one or more RSs;

using the one or more measurement results and the power saving configuration to perform an evaluation of a triggering condition, wherein the triggering condition is defined in the power saving configuration;

performing one or more operations when the triggering condition is satisfied, wherein the one or more operations are performed according to the power saving configuration, wherein the one or more operations include sending the one or more measurement results, and wherein when the one or more measurement results are received by the base station, the base station provides an activation indication; and entering the power saving mode, wherein the power saving mode is entered into in response to the activation indication.

* * * * *